United States Patent
Miller et al.

(10) Patent No.: US 10,241,244 B2
(45) Date of Patent: Mar. 26, 2019

(54) THIN FILM TOTAL INTERNAL REFLECTION DIFFRACTION GRATING FOR SINGLE POLARIZATION OR DUAL POLARIZATION

(71) Applicant: Lumentum Operations LLC, Milpitas, CA (US)

(72) Inventors: John Michael Miller, Gatineau (CA); Gonzalo Wills, Ottawa (CA); Lu Tian, Palo Alto, CA (US); Michael O'Leary, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/224,070

(22) Filed: Jul. 29, 2016

(65) Prior Publication Data

US 2018/0031744 A1    Feb. 1, 2018

(51) Int. Cl.
    *G02B 1/12*      (2006.01)
    *G02B 5/18*      (2006.01)
    *G02B 27/42*     (2006.01)

(52) U.S. Cl.
    CPC ......... *G02B 5/1857* (2013.01); *G02B 5/1814* (2013.01); *G02B 5/1861* (2013.01); *G02B 27/4261* (2013.01)

(58) Field of Classification Search
CPC .. G02B 5/1857; G02B 5/1814; G02B 5/1861; G02B 6/10; G02B 27/4261
USPC ....................... 359/485.03, 566–576; 385/37
See application file for complete search history.

(56) References Cited

U.S. PATENT DOCUMENTS

| | | |
|---|---|---|
| 4,523,809 A | 6/1985 | Taboada et al. |
| 4,948,258 A | 8/1990 | Caimi |
| 5,081,421 A | 1/1992 | Miller et al. |
| 5,124,843 A | 6/1992 | Leger et al. |
| 5,161,059 A | 11/1992 | Swanson et al. |
| 5,433,651 A | 7/1995 | Lustig et al. |
| 5,646,730 A | 7/1997 | Mitchell et al. |
| 5,907,436 A | 5/1999 | Perry et al. |
| RE36,352 E | 10/1999 | Swanson et al. |
| 5,995,285 A | 11/1999 | Unno |
| 6,008,942 A | 12/1999 | Ogusu et al. |
| 6,021,106 A | 2/2000 | Welch et al. |
| 6,122,104 A | 9/2000 | Nakai |

(Continued)

FOREIGN PATENT DOCUMENTS

| | | |
|---|---|---|
| WO | WO2012164037 | 12/2012 |
| WO | WO2015168182 | 11/2015 |

OTHER PUBLICATIONS

Macleod, "Thin-Film Optical Filters," http://kashanu.ac.ir/Files/thin%20film%20optical%20filter(macklod).pdf, 2001, 667 pages.

(Continued)

*Primary Examiner* — Frank G Font
(74) *Attorney, Agent, or Firm* — Harrity & Harrity, LLP

(57) ABSTRACT

A diffraction grating may include a substrate. The diffraction grating may include an etch stop layer to prevent etching of the substrate. The etch stop layer may be deposited on the substrate. The diffraction grating may include a marker layer to indicate an etch end-point associated with etching of a dielectric layer. The marker layer may be deposited on a portion of the etch stop layer. The diffraction grating may include the dielectric layer to form a grating layer after being etched. The dielectric layer may be deposited on at least the marker layer.

20 Claims, 18 Drawing Sheets

(56) References Cited

U.S. PATENT DOCUMENTS

| | | | |
|---|---|---|---|
| 6,136,662 A | 10/2000 | Allman et al. |
| 6,262,846 B1 | 7/2001 | Nakai |
| 6,292,297 B1 | 9/2001 | Danziger et al. |
| 6,330,110 B2 | 12/2001 | Nakai |
| 6,462,875 B1 | 10/2002 | Ishii |
| 6,560,019 B2 | 5/2003 | Nakai |
| 6,569,608 B2 | 5/2003 | Tanaka et al. |
| 6,650,477 B2 | 11/2003 | Nakai |
| 6,670,105 B2 | 12/2003 | Terada et al. |
| 6,683,718 B2 | 1/2004 | Sugiyama et al. |
| 6,724,533 B2 | 4/2004 | Hoose et al. |
| 6,728,034 B1 | 4/2004 | Nakanishi et al. |
| 6,760,159 B2 | 7/2004 | Nakai |
| 6,813,080 B2 | 11/2004 | Raguin et al. |
| 6,859,319 B2 | 2/2005 | Hayashi |
| 6,987,615 B2 | 1/2006 | Shiono et al. |
| 6,998,196 B2 | 2/2006 | Rich et al. |
| 7,146,076 B2 | 12/2006 | Fujieda |
| 7,212,663 B2 | 5/2007 | Tomasi |
| 7,268,947 B2 | 9/2007 | Shiono et al. |
| 7,327,857 B2 | 2/2008 | Lloyd, Jr. et al. |
| 7,429,437 B2 | 9/2008 | Rich et al. |
| 7,544,945 B2 | 6/2009 | Tan et al. |
| 7,763,841 B1 | 7/2010 | McEldowney |
| 7,777,173 B2 | 8/2010 | Price et al. |
| 8,050,461 B2 | 11/2011 | Shpunt et al. |
| 8,150,142 B2 | 4/2012 | Freedman et al. |
| 8,159,682 B2 | 4/2012 | Bell |
| 8,165,436 B2 | 4/2012 | Mossberg et al. |
| 8,203,789 B1 | 6/2012 | Martinelli et al. |
| 8,282,217 B2 | 10/2012 | Mochizuki |
| 8,320,621 B2 | 11/2012 | McEldowney |
| 8,350,847 B2 | 1/2013 | Shpunt |
| 8,374,397 B2 | 2/2013 | Shpunt et al. |
| 8,384,997 B2 | 2/2013 | Shpunt et al. |
| 8,390,821 B2 | 3/2013 | Shpunt et al. |
| 8,400,494 B2 | 3/2013 | Zaleveky et al. |
| 8,492,696 B2 | 7/2013 | Akerman et al. |
| 8,494,252 B2 | 7/2013 | Freedman et al. |
| 8,558,873 B2 | 10/2013 | McEldowney |
| 8,593,732 B1 | 11/2013 | Greiner et al. |
| 8,599,484 B2 | 12/2013 | Miyasaka et al. |
| 8,630,039 B2 | 1/2014 | Shpunt |
| 8,670,029 B2 | 3/2014 | McEldowney |
| 8,705,013 B2 | 4/2014 | Inoue |
| 8,723,923 B2 | 5/2014 | Bloom et al. |
| 8,727,567 B1 | 5/2014 | Tien et al. |
| 8,730,309 B2 | 5/2014 | Wilson et al. |
| 8,749,796 B2 | 6/2014 | Pesach et al. |
| 8,755,036 B2 | 6/2014 | Hutchin |
| 8,761,495 B2 | 6/2014 | Freedman et al. |
| 8,761,594 B1 | 6/2014 | Gross et al. |
| 8,810,803 B2 | 8/2014 | Bell |
| 8,976,367 B2 | 3/2015 | Bellis et al. |
| 8,989,537 B2 | 3/2015 | Mossberg et al. |
| 9,036,158 B2 | 5/2015 | Pesach |
| 9,046,359 B2 | 6/2015 | Skidmore et al. |
| 9,063,283 B2 | 6/2015 | Shpunt et al. |
| 9,066,084 B2 | 6/2015 | Zalevsky et al. |
| 9,091,413 B2 | 7/2015 | Petronius et al. |
| 9,092,090 B2 | 7/2015 | Zhang et al. |
| 9,131,136 B2 | 9/2015 | Shpunt et al. |
| 9,142,025 B2 | 9/2015 | Park et al. |
| 9,157,790 B2 | 10/2015 | Shpunt et al. |
| 9,167,138 B2 | 10/2015 | Shpunt et al. |
| 9,197,881 B2 | 11/2015 | Moshe |
| 9,228,697 B2 | 1/2016 | Schneider et al. |
| 9,229,107 B2 | 1/2016 | Bell |
| 9,239,467 B2 | 1/2016 | Shpunt et al. |
| 9,273,846 B1 | 3/2016 | Rossi et al. |
| 9,294,754 B2 | 3/2016 | Billerbeck et al. |
| 9,318,877 B2 | 4/2016 | Herschbach et al. |
| 9,322,962 B1 | 4/2016 | Chern et al. |
| 9,325,973 B1 | 4/2016 | Hazeghi et al. |
| 9,400,177 B2 | 7/2016 | Pesach |
| 9,437,006 B2 | 9/2016 | Zalevsky et al. |
| 9,441,960 B2 | 9/2016 | Schenk |
| 9,443,310 B2 | 9/2016 | Hudman et al. |
| 9,477,018 B2 | 10/2016 | Miyasaka et al. |
| 9,479,757 B2 | 10/2016 | Michel et al. |
| 9,503,708 B2 | 11/2016 | Hazeghi et al. |
| 9,506,749 B2 | 11/2016 | Bellis et al. |
| 9,521,399 B1 | 12/2016 | Hazeghi et al. |
| 9,551,914 B2 | 1/2017 | Pellman et al. |
| 9,553,423 B2 | 1/2017 | Chen et al. |
| 9,554,122 B2 | 1/2017 | Shpunt et al. |
| 9,562,760 B2 | 2/2017 | Braker et al. |
| 9,678,355 B2 | 6/2017 | Cayer |
| 9,684,103 B2 | 6/2017 | Liao et al. |
| 9,703,016 B1 | 7/2017 | Chern et al. |
| 9,712,806 B2 | 7/2017 | Olmstead |
| 9,720,147 B2 | 8/2017 | Miller et al. |
| 9,726,540 B2 | 8/2017 | Popovich et al. |
| 9,729,853 B2 | 8/2017 | Billerbeck et al. |
| 9,740,019 B2 | 8/2017 | Mor |
| 9,746,369 B2 | 8/2017 | Shpunt et al. |
| 9,749,513 B2 | 8/2017 | Grossinger |
| 9,762,793 B2 | 9/2017 | Ackley et al. |
| 9,791,696 B2 | 10/2017 | Woltman et al. |
| 9,797,708 B2 | 10/2017 | Vredenborg et al. |
| 9,817,164 B2 | 11/2017 | Murakowski et al. |
| 9,825,425 B2 | 11/2017 | Mor |
| 9,826,216 B1 | 11/2017 | Hazeghi et al. |
| 9,843,733 B2 | 12/2017 | Chern et al. |
| 9,847,619 B2 | 12/2017 | Chern et al. |
| 9,854,226 B2 | 12/2017 | Ko et al. |
| 9,869,753 B2 | 1/2018 | Eldada |
| 9,874,637 B2 | 1/2018 | Park et al. |
| 9,885,459 B2 | 2/2018 | Freedman et al. |
| 9,885,870 B2 | 2/2018 | Stenberg et al. |
| 2003/0123159 A1 | 7/2003 | Morita et al. |
| 2004/0256628 A1 | 12/2004 | Chin et al. |
| 2004/0263981 A1 | 12/2004 | Coleman |
| 2006/0029889 A1 | 2/2006 | Wang |
| 2006/0050391 A1 | 3/2006 | Backlund et al. |
| 2007/0103782 A1 | 5/2007 | Lee et al. |
| 2008/0106789 A1 | 5/2008 | Hirai et al. |
| 2009/0128911 A1 | 5/2009 | Itzkovitch et al. |
| 2009/0185274 A1 | 7/2009 | Shpunt |
| 2010/0020400 A1 | 1/2010 | Amako |
| 2010/0073461 A1 | 3/2010 | Hammes et al. |
| 2010/0149551 A1 | 6/2010 | Malinkevich |
| 2010/0277937 A1 | 11/2010 | Ilzuka et al. |
| 2011/0069389 A1 | 3/2011 | Shpunt |
| 2011/0188054 A1 | 8/2011 | Petronius et al. |
| 2012/0218464 A1 | 8/2012 | Ben-Moshe et al. |
| 2012/0275746 A1 | 11/2012 | Mossberg et al. |
| 2013/0044187 A1 | 2/2013 | Hammes et al. |
| 2013/0250066 A1 | 9/2013 | Abraham |
| 2014/0211215 A1 | 7/2014 | Pesach et al. |
| 2014/0307307 A1 | 10/2014 | Georgiou et al. |
| 2014/0340484 A1 | 11/2014 | Pfister et al. |
| 2015/0009290 A1 | 1/2015 | Mankowski et al. |
| 2015/0070489 A1 | 3/2015 | Hudman et al. |
| 2015/0235460 A1 | 8/2015 | Schowengerdt et al. |
| 2015/0276998 A1 | 10/2015 | Miller et al. |
| 2015/0288145 A1 | 10/2015 | Fattal et al. |
| 2015/0292709 A1 | 10/2015 | Petronius et al. |
| 2015/0309220 A1 | 10/2015 | Greiner et al. |
| 2015/0312554 A1 | 10/2015 | Banks et al. |
| 2015/0316368 A1 | 11/2015 | Moench et al. |
| 2015/0355470 A1 | 12/2015 | Herschbach |
| 2016/0004145 A1 | 1/2016 | Shpunt et al. |
| 2016/0025993 A1 | 1/2016 | Mor et al. |
| 2016/0065945 A1 | 3/2016 | Yin et al. |
| 2016/0072258 A1 | 3/2016 | Seurin et al. |
| 2016/0124240 A1 | 5/2016 | Chern et al. |
| 2016/0178915 A1 | 6/2016 | Mor et al. |
| 2016/0191867 A1 | 6/2016 | Abraham |
| 2016/0223823 A1 | 8/2016 | Chern et al. |
| 2016/0223828 A1 | 8/2016 | Abraham et al. |
| 2016/0238855 A1 | 8/2016 | Kriman et al. |
| 2016/0255338 A1 | 9/2016 | Song et al. |
| 2016/0260223 A1 | 9/2016 | Gren et al. |

(56) References Cited

U.S. PATENT DOCUMENTS

| | | |
|---|---|---|
| 2016/0286202 A1 | 9/2016 | Romano et al. |
| 2016/0291200 A1 | 10/2016 | Bakin et al. |
| 2016/0341829 A1 | 11/2016 | Hudman et al. |
| 2016/0352071 A1 | 12/2016 | Hogan et al. |
| 2016/0352074 A1 | 12/2016 | Hogan et al. |
| 2016/0377414 A1 | 12/2016 | Thuries et al. |
| 2017/0003122 A1 | 1/2017 | Pesach et al. |
| 2017/0003504 A1 | 1/2017 | Vallius et al. |
| 2017/0003505 A1 | 1/2017 | Vallius et al. |
| 2017/0023666 A1 | 1/2017 | Chern et al. |
| 2017/0031171 A1 | 2/2017 | Vallius et al. |
| 2017/0038505 A1 | 2/2017 | Chern et al. |
| 2017/0038513 A1 | 2/2017 | Chern et al. |
| 2017/0051896 A1 | 2/2017 | Chern et al. |
| 2017/0059873 A1 | 3/2017 | Chern et al. |
| 2017/0059879 A1 | 3/2017 | Vallius |
| 2017/0068098 A1 | 3/2017 | Chern et al. |
| 2017/0082862 A1 | 3/2017 | Downing |
| 2017/0102543 A1 | 4/2017 | Vallius |
| 2017/0104314 A1 | 4/2017 | Park et al. |
| 2017/0115379 A1 | 4/2017 | Yang et al. |
| 2017/0116757 A1 | 4/2017 | Shpunt et al. |
| 2017/0131560 A1 | 5/2017 | Liao et al. |
| 2017/0142393 A1 | 5/2017 | Oggier |
| 2017/0150124 A1 | 5/2017 | Thuries |
| 2017/0184291 A1 | 6/2017 | Chern et al. |
| 2017/0186166 A1 | 6/2017 | Grunnet-Jepsen et al. |
| 2017/0187997 A1 | 6/2017 | Hsiao et al. |
| 2017/0188016 A1 | 6/2017 | Hudman et al. |
| 2017/0194768 A1 | 7/2017 | Powers et al. |
| 2017/0195653 A1 | 7/2017 | Trail et al. |
| 2017/0199029 A1 | 7/2017 | Raz |
| 2017/0199144 A1 | 7/2017 | Noble et al. |
| 2017/0199310 A1 | 7/2017 | Okano |
| 2017/0227416 A1 | 8/2017 | Chen et al. |
| 2017/0287151 A1 | 10/2017 | Han et al. |
| 2017/0307736 A1 | 10/2017 | Donovan |
| 2017/0307897 A1 | 10/2017 | Chern et al. |
| 2017/0309685 A1 | 10/2017 | Heimgartner et al. |
| 2017/0315275 A1 | 11/2017 | Piehler |
| 2017/0322424 A1 | 11/2017 | Rossi |
| 2017/0353004 A1 | 12/2017 | Chen et al. |
| 2017/0357141 A1 | 12/2017 | De Smet et al. |
| 2018/0031744 A1 | 2/2018 | Miller et al. |

OTHER PUBLICATIONS

Smith et al., "Diffraction Gratings Utilizing Total Internal Reflection Facets in Littrow Configuration," http://ieeexplore.ieee.org/xpl/login.jsp?tp=&arnumber=736401&url=http%3A%2F%2Fieeexplore.ieee.org%2Fxpls%2Fabs_all.jsp%3Farnumber%3D736401, Jan. 1999, 4 pages.

Marciante et al., "High-efficiency, high-dispersion diffraction gratings based on total internal reflection," https://www.osapublishing.org/ol/abstract.cfm?uri=ol-29-6-542, Mar. 15, 2004, 3 pages.

U.S. Appl. No. 14/798,764, filed Jul. 14, 2015 entitled "Zoned Optical Waveplate," Miller et al., 35 pages.

Lynch et al., "Optical Constants of Metals," Handbook of Optical Constants of Solids, Academic Press, 1991, 1 page.

Marciante et al., "Polarization-insensitive high-dispersion total internal reflection diffraction gratings," Journal of the Optical Society of America A, vol. 22, No. 2, Feb. 2005, 7 pages.

Ratzsch et al., "Encapsulation process for diffraction gratings," Optics Express, vol. 23, No. 14, Jul. 1, 2015 11 pages.

Edward D. Palik ed., "Handbook of Optical Constants and Solids," Part 1, 1991, pp. 294-295.

THIN FILM TOTAL INTERNAL REFLECTION DIFFRACTION GRATING FOR SINGLE POLARIZATION OR DUAL POLARIZATION

TECHNICAL FIELD

The present disclosure relates to a reflective diffraction grating and, more particularly, to a thin film total internal reflection (TIR) diffraction grating. The present disclosure also relates to a method of manufacturing such a thin film TIR diffraction grating.

BACKGROUND

A reflective diffraction grating is used to provide wavelength dispersion in a wavelength-selective optical device, such as a wavelength selective switch (WSS). The reflective diffraction grating may be employed (e.g., within a grism) in a double pass configuration, such that an optical path of the WSS results in light passing through the reflective diffraction grating twice.

SUMMARY

According to some possible implementations, a diffraction grating may include a substrate; an etch stop layer to prevent etching of the substrate, where the etch stop layer may be deposited on the substrate; a marker layer to indicate an etch end-point associated with etching of a dielectric layer, where the marker layer may be deposited on a portion of the etch stop layer; and the dielectric layer to form a grating layer after being etched, where the dielectric layer may be deposited on at least the marker layer.

According to some possible implementations, a diffraction grating, to operate based on total internal reflection, may include: a substrate; an etch stop layer to prevent etching of the substrate, where the etch stop layer may be formed on the substrate; a dielectric grating layer on the etch stop layer; and an encapsulation layer to protect the dielectric grating layer, where the encapsulation layer may be formed on at least the dielectric grating layer.

According to some possible implementations, a method of manufacturing a diffraction grating may include: depositing an etch stop layer on a substrate; depositing a marker layer on a portion of the etch stop layer; depositing a dielectric layer on the marker layer; and etching the dielectric layer to form a grating layer, during etching the dielectric layer, the method may include preventing, by the etch stop layer, etching of the substrate; and determining, based on etching the marker layer, that etching is to be stopped.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

A typical reflective diffraction grating includes a substrate and a reflective grating layer. Such a reflective diffraction grating is typically designed to achieve high diffraction efficiency (DE) in the $-1^{st}$ order for a particular polarization of light, such as the transverse-magnetic (TM) polarization, when the reflective diffraction grating is in first order Littrow mount. The typical reflective diffraction grating can be attached to a prism (e.g., with an optical epoxy) in order to form a grism.

Figure 1:
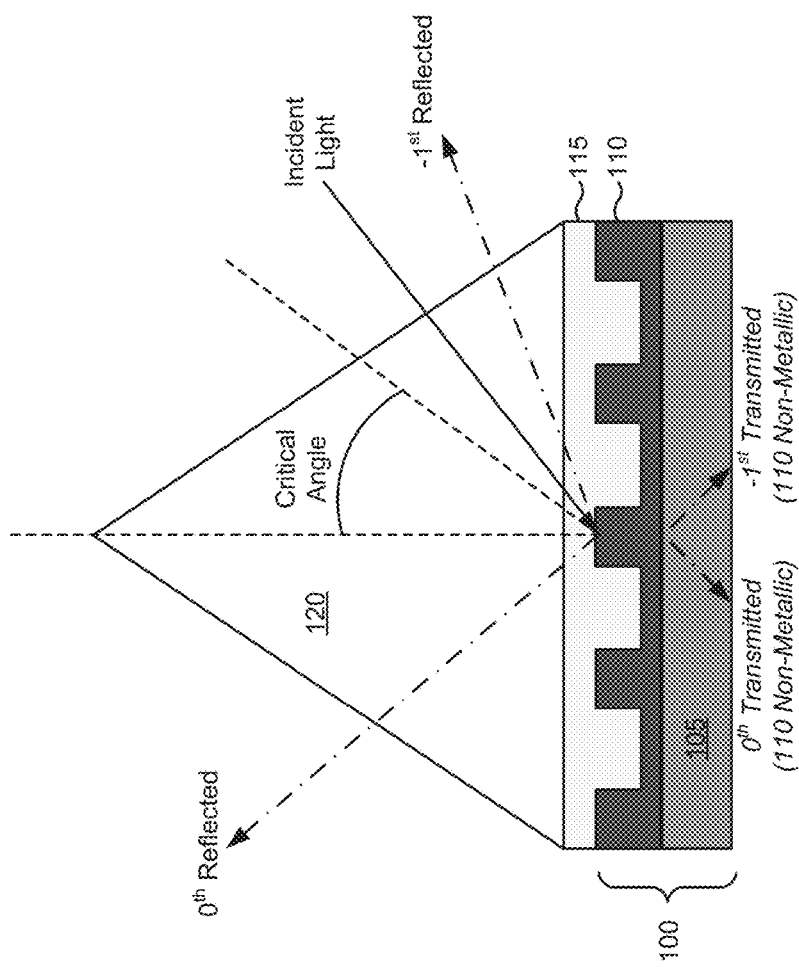
FIG. 1 is a diagram of an example prior reflective diffraction grating.

FIG. 1 is a diagram of an example prior reflective diffraction grating 100 (herein referred to as prior diffraction grating 100) attached to a prism 120. As shown in FIG. 1, prior diffraction grating 100 includes substrate 105 and reflective grating layer 110, and is attached to prism 120 with optical epoxy 115. As shown in FIG. 1, reflective grating layer 110 is embedded in optical epoxy 115 such that a binary grating profile of reflective grating layer 110 (e.g., a series of grooves etched in reflective grating layer 110 to create a series of ridges) is between substrate 105 and prism 120. In some cases, reflective grating layer 110 may have a profile different than a binary grating profile, such as a sinusoidal grating profile, a triangular grating profile, or the like. A typical single polarization prior diffraction grating 100 is designed such that a DE in a particular order (e.g., the $-1^{st}$ order) for the TM polarization is high (e.g., ≥90%) and a DE in the particular order for the transverse-electric (TE) polarization is low (e.g., ≤8%).

Substrate 105 is typically formed of a dielectric material, such as fused silica ($SiO_2$), or another type of glass. In some cases, reflective grating layer 110 is formed of and/or coated with a reflective metallic material, such as gold. However, prior diffraction grating 100 with a gold reflective grating layer 110 (herein referred to as gold prior diffraction grating 100) may cause a significant amount of insertion loss. For example, gold prior diffraction grating 100 may have single pass insertion loss in a range from approximately −0.2 decibels (dB) to approximately −0.3 dB. Thus, in the typical double pass configuration, gold prior diffraction grating 100 may have insertion loss in a range from approximately −0.4 dB to approximately −0.6 dB.

The insertion loss of gold prior diffraction grating 100 is attributable to at least two factors. One factor that causes this insertion loss is that the gold of reflective grating layer 110 has a reflectance that is less than 100%. In other words, the gold of reflective grating layer 110 does not reflect all light incident upon reflective grating layer 110. This causes a maximum achievable DE for gold prior diffraction grating 100 to be less than 100%. For example, for incident light with a wavelength of 1550 nanometers (nm), a reflectance of the gold reflective grating layer 110 is approximately 97%, which accounts for approximately −0.13 dB of insertion loss.

Another factor that causes the insertion loss associated with gold prior diffraction grating 100 is non-perfect −1$^{st}$ order blazing caused by the binary grating profile of reflective grating layer 110 upon which light is incident (i.e., the non-planar surface of reflective grating layer 110 formed by the grooves and ridges). For example, for light with a wavelength of 1550 nm, the binary grating profile of reflective grating layer 110 causes non-perfect −1$^{st}$ order blazing that results in insertion loss of approximately −0.12 dB or more. Thus, based on these two factors, a total single pass insertion loss of gold prior diffraction grating 100 may be in a range from approximately −0.25 dB to −0.31 dB, meaning that a DE in the −1$^{st}$ order for the TM polarization may range from approximately 93.2% to 94.4%.

One manner in which to improve the DE of prior diffraction grating 100 is to improve upon the reflectance of the metallic material (e.g., gold) of reflective grating layer 110. Thus, in some cases, reflective grating layer 110 is formed using one or more reflective dielectric thin film layers (e.g., rather than the metallic layer). However, while relatively few (e.g., fewer than five) dielectric thin film layers can achieve near-perfect blazing (e.g., a DE of approximately 100%) in the −1$^{st}$ order for the TE polarization, a substantially larger number of reflective dielectric thin film layers (e.g., more than 30) are needed in order to achieve high DE (e.g., greater than 94%) in the −1$^{st}$ order for the TM polarization when the light has a high angle of incidence (e.g., when prior diffraction grating 100 is in first order Littrow mount, as in the typical case). As such, manufacture of prior diffraction grating 100 is expensive, time consuming, and/or complex when using reflective dielectric thin film layers to achieve high DE in the −1$^{st}$ order for the TM polarization.

Furthermore, the DE associated with reflective dielectric thin film layers in prior diffraction grating 100 may have a significant roll-off (e.g., a sharp decrease in DE) as a wavelength of light deviates from a design wavelength (e.g., a wavelength near a center of the conventional band (C band), a wavelength near a center of the long wavelength band (L band), or the like). Moreover, and unlike a metallic (e.g., gold) reflective grating layer 110, reflective dielectric thin film layer 110 permits propagation of at least two transmitted orders into substrate 105. This may result in additional insertion loss (e.g., when light leaks in the transmitted orders) and, thus, may further reduce the DE of prior diffraction grating 100. Such transmitted orders are illustrated by the "0$^{th}$ Transmitted" and "−1$^{st}$ Transmitted" dashed lines in FIG. 1.

Implementations described herein provide various implementations of thin film dielectric reflective diffraction gratings that operate based on total internal reflection (TIR) (herein referred to as thin film TIR diffraction gratings). The thin film TIR diffraction gratings, described herein, include a small number (e.g., one, two) of reflective dielectric thin film layers, while still achieving high DE (e.g., greater than 94%) in the −1$^{st}$ order for the TM polarization and/or the TE polarization. Furthermore, the thin film TIR diffraction gratings, described herein, prevent propagation of transmitted orders, thereby preventing insertion loss due to light leaking in such transmitted orders. In some implementations, the thin film TIR diffraction grating may be designed to achieve high DE for a single polarization (e.g., the TM polarization or the TE polarization), or dual polarizations of light (e.g., the TM polarization and the TE polarization), as described elsewhere herein.

In some implementations, manufacturability and/or reliability of the thin film TIR diffraction grating may be improved by including an etch stop layer associated with protecting a substrate during etching, a marker layer associated with signaling or indicating an etch end-point during etching, and/or an encapsulation layer associated with protecting the thin film grating layer of the thin film TIR diffraction grating (e.g., during an optical bonding process, during shipping, during cleaning, or the like), as described below.

Figure 2:
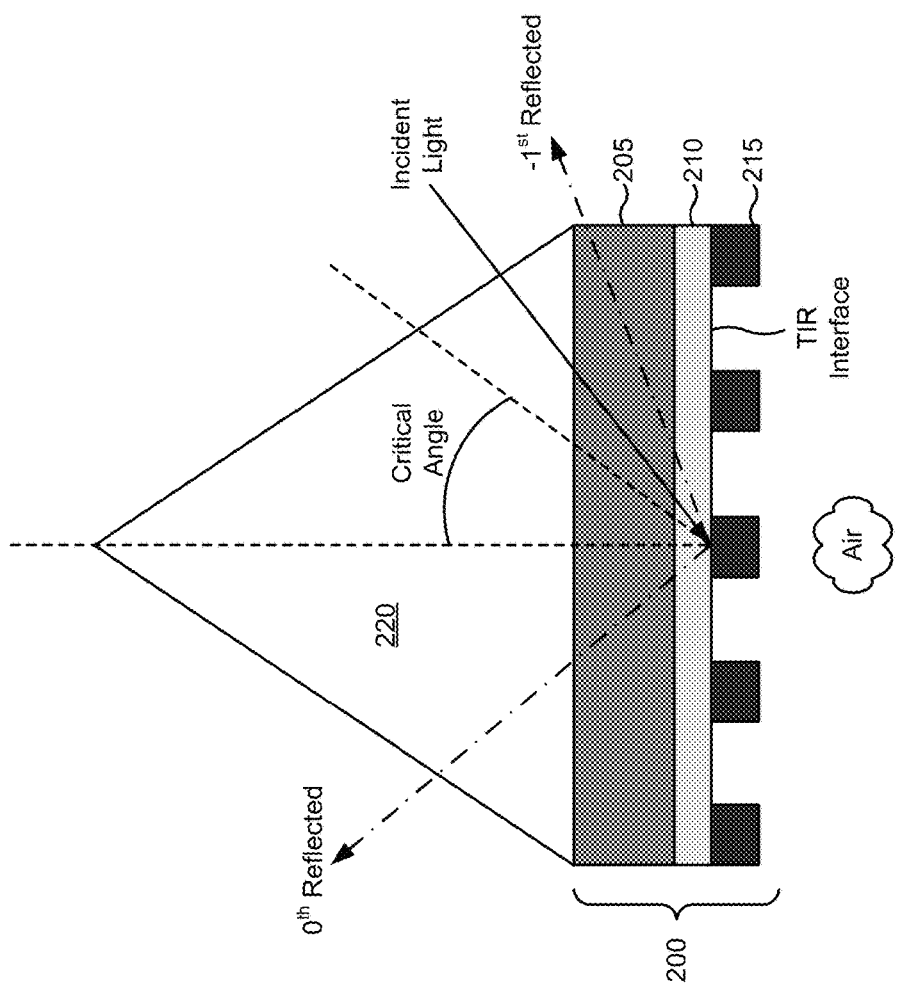
FIG. 2 is a diagram of a first example implementation of a thin film diffraction grating designed to operate based on TIR.

FIG. 2 is a diagram of an example implementation of a thin film diffraction grating 200 designed to operate based on TIR. As shown in FIG. 2, thin film TIR diffraction grating 200 may include a substrate 205, an etch stop layer 210, and a thin film grating layer 215. As shown, thin film TIR diffraction grating 200 may be attached to optical element 220 (e.g., in order to form a grism when optical element 220 is a prism). In some implementations, optical element 220 may have a triangular shape (e.g., optical element 220 may be a prism) or a non-triangular shape (e.g., optical element 220 may be a multi-surface trapezoid, a sphere, or the like).

Substrate 205 includes a layer on which additional layers of thin film TIR diffraction grating 200 may be deposited. In some implementations, substrate 205 may be formed of a dielectric material, such as fused silica, or another type of glass.

Etch stop layer 210 includes a layer formed of a material that is resistant to etching. For example, etch stop layer 210 may include a layer formed of aluminum oxide ($Al_2O_3$) that is resistant to reactive ion etching (RIE). In this case, etch stop layer 210 may ensure that gases, associated with the RIE process, do not penetrate substrate 205 in order to prevent substrate 205 from being etched (which, if allowed, may negatively affect a DE of thin film TIR diffraction grating 200). As shown, etch stop layer 210 may be disposed between substrate 205 and thin film grating layer 215.

Thin film grating layer 215 (sometimes referred to as a dielectric grating layer) is a reflective dielectric grating layer that diffracts incident light. As shown, thin film grating layer 215 may have a binary grating profile comprising ridges separated by grooves, where the grooves may be formed in a layer of dielectric material in order to form thin film grating layer 215 by etching, as described below. In some implementations, the ridges may be rectangular in cross-section. Additionally, or alternatively, the ridges may be trapezoidal in cross-section, or take on another shape. In some implementations, tops of the ridges of thin film grating layer 215 are substantially parallel to a top surface of the substrate 205, and sidewalls of the ridges are substantially perpendicular to the top surface of the substrate 205 (e.g., when the ridges are rectangular in cross-section). In some implementations, the grating profile may be sinusoidal, triangular, trapezoidal, or take on another periodic shape. A binary step may be a preferred grating profile because it is simple to manufacture by photolithographic etching.

In some implementations, thin film grating layer 215 may be formed from a dielectric layer that includes a small number (e.g., one or two) layers of a dielectric material with an index of refraction (n) that is higher than an index of refraction of air (n=1), such as silicon (Si, n=3.60), tantala ($Ta_2O_5$, n=2.10), silica ($SiO_2$, n=1.45), or the like. In some implementations, the dielectric material from which thin film grating layer 215 is formed may be selected or identified based on a desired DE, as described below.

The arrangement of layers of thin film TIR diffraction grating 200 allows thin film TIR diffraction grating 200 to operate based on TIR for light that is incident beyond a critical angle (e.g., as shown in FIG. 2). Here, light that is incident beyond the critical angle is not refracted, but is totally internally reflected (e.g., in the specularly reflected ($0^{th}$) order, in the $\pm 1^{st}$ reflected diffraction order that is present when thin film grating layer 215 is attached to the bottom of etch stop layer 210), with 100% reflectance being possible in both the TM polarization and the TE polarization. The arrangement of the layers shown in FIG. 2 permits such TIR operation by creating a TIR interface (e.g., a flat, planar grating/air interface, rather than a non-planar surface as with prior diffraction grating 100) at a lower surface of etch stop layer 210. TIR operation of thin film TIR diffraction grating 200 is possible when a pitch of thin film TIR diffraction grating 200 is less than or equal to half of a design wavelength. The grating pitch is a distance from an edge of a groove of thin film grating layer 215 to a corresponding edge of an adjacent groove. A groove width is a distance between edges of a groove. A normalized groove width is a portion (e.g., a percentage) of the grating pitch that is a groove (i.e., a portion of the pitch that is not a ridge). A grating height is a depth of a groove (i.e., a height of a ridge).

Substrate transmitted orders are eliminated due to the TIR operation of thin film TIR diffraction grating 200 and the arrangement of the layers of thin film TIR diffraction grating 200 (e.g., since thin film grating layer 215 is positioned on an outer surface of substrate 205, rather than between optical element 220 and substrate 205). Further, thin film grating layer 215 need not be embedded in epoxy between optical element 220 and substrate 205. Without a need to embed thin film grating layer 215 in epoxy (e.g., in order to attach thin film TIR diffraction grating 200 to optical element 220), bending or warping of thin film grating layer 215 caused by use of such epoxy (e.g., due to expansion or contraction of the epoxy) is eliminated.

The heights, widths, and thicknesses of layers shown in FIG. 2 are provided as examples, and are exaggerated for illustrative purposes. Further, thin film TIR diffraction grating 200 may include additional layers, fewer layers, different layers, or differently arranged layers than those shown in FIG. 2.

Figure 3A:
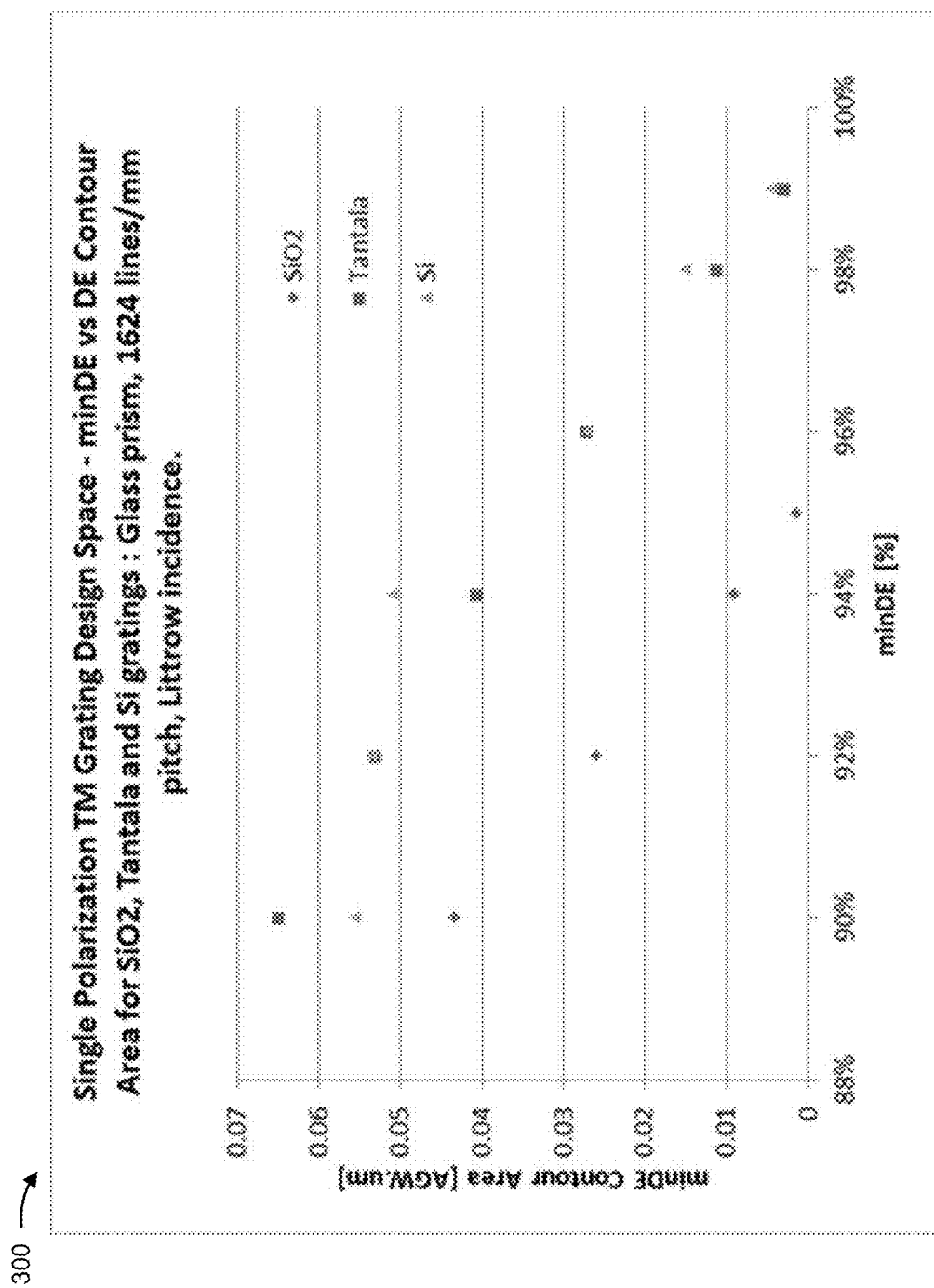
FIGS. 3A-3F are diagrams associated with design and performance of the first example implementation of FIG. 2.

FIGS. 3A-3F are diagrams associated with design and performance of the thin film TIR diffraction grating 200 of FIG. 2. FIG. 3A is a diagram 300 of an example graph showing contour areas needed to achieve various minimum DEs in the $-1^{st}$ order for the TM polarization for thin film TIR diffraction grating 200 that includes thin film grating layer 215 formed of one of silica, tantala, and silicon. Other materials having sufficiently high refractive indices for the desired wavelengths of light are also possible. As noted, FIG. 3A corresponds to a thin film grating layer 215 with a pitch having 1624 lines (i.e., repeating patterns such as a binary ridge and gap) per millimeter (lines/mm), and arranged in Littrow mount. The contour area may refer to a width of a groove of thin film grating layer 215 times a depth of the groove (i.e., a height of a ridge of thin film grating layer 215).

As shown in FIG. 3A, the size of contour areas are generally larger for thin film grating layers 215 formed of silicon or tantala, rather than silica. In other words, manufacturability of thin film grating layer 215 formed of silicon or tantala may be increased as compared to that of thin film grating layer 215 formed of silica (e.g., since less fine etching is needed). Thus, in some cases, silicon or tantala may be selected for thin film grating layer 215 in order to increase manufacturability of thin film grating layer 215. As illustrated in FIG. 3A, thin film grating layer 215 should not be formed of silica when the desired DE in the $-1^{st}$ order for the TM polarization is greater than approximately 95%.

As further shown, the size of the contour areas generally decreases (e.g., for silicon, tantala, and silica) as the required minimum DE increases. In other words, as the desired minimum DE increases, finer etching is needed. For example, when thin film grating layer 215 is formed of silicon, a contour area with a size of approximately 0.055 square microns is needed in order to achieve 90% DE in the $-1^{st}$ order for the TM polarization. Conversely, when thin film grating layer 215 is formed of silicon, a contour area with a size of approximately 0.005 square microns is needed in order to achieve 99% DE in the $-1^{st}$ order for the TM polarization. As such, manufacturability of the thin film grating layer 215 may generally decrease as the desired DE increases.

Nonetheless, as shown by FIG. 3A, silica, silicon, or tantala may be selected for formation of thin film grating layer 215 in order to achieve a DE from approximately 94% to approximately 95% (with a silica thin film grating layer 215 being the most difficult to manufacture due to a need for smaller contour areas). Silicon or tantala may be selected for formation of thin film grating layer 215 in order to achieve a DE greater than approximately 95%. Notably, a contour area of a silicon thin film grating layer 215 that is needed to achieve 98% DE or 99% DE is larger than a contour area of a tantala thin film grating layer 215 that is needed to achieve 98% DE or 99% DE. Thus, in some cases, silicon may be selected for formation of thin film grating layer 215 rather than tantala (e.g., since the larger contour areas of silicon thin film grating layer 215 are more easily manufactured). However, while implementations described below describe thin film grating layer 215 as being formed of silicon, in some implementations, thin film grating layer 215 may be formed of silica, tantala, or another suitable material.

As noted above, FIG. 3A is provided as an example associated with achieving various DEs in the $-1^{st}$ order for the TM polarization for a thin film grating layer 215 formed of silica, tantala, and silicon, where thin film grating layer 215 includes 1624 lines/mm, and is arranged in Littrow mount. In practice, thin film grating layer 215 may be formed of a different material, different pitch (may have additional or fewer number of lines/mm), may be designed for high DE in a different order (e.g., the $0^{th}$ order), or may otherwise be differently configured than as described above with regard to FIG. 3A.

Figure 3B:
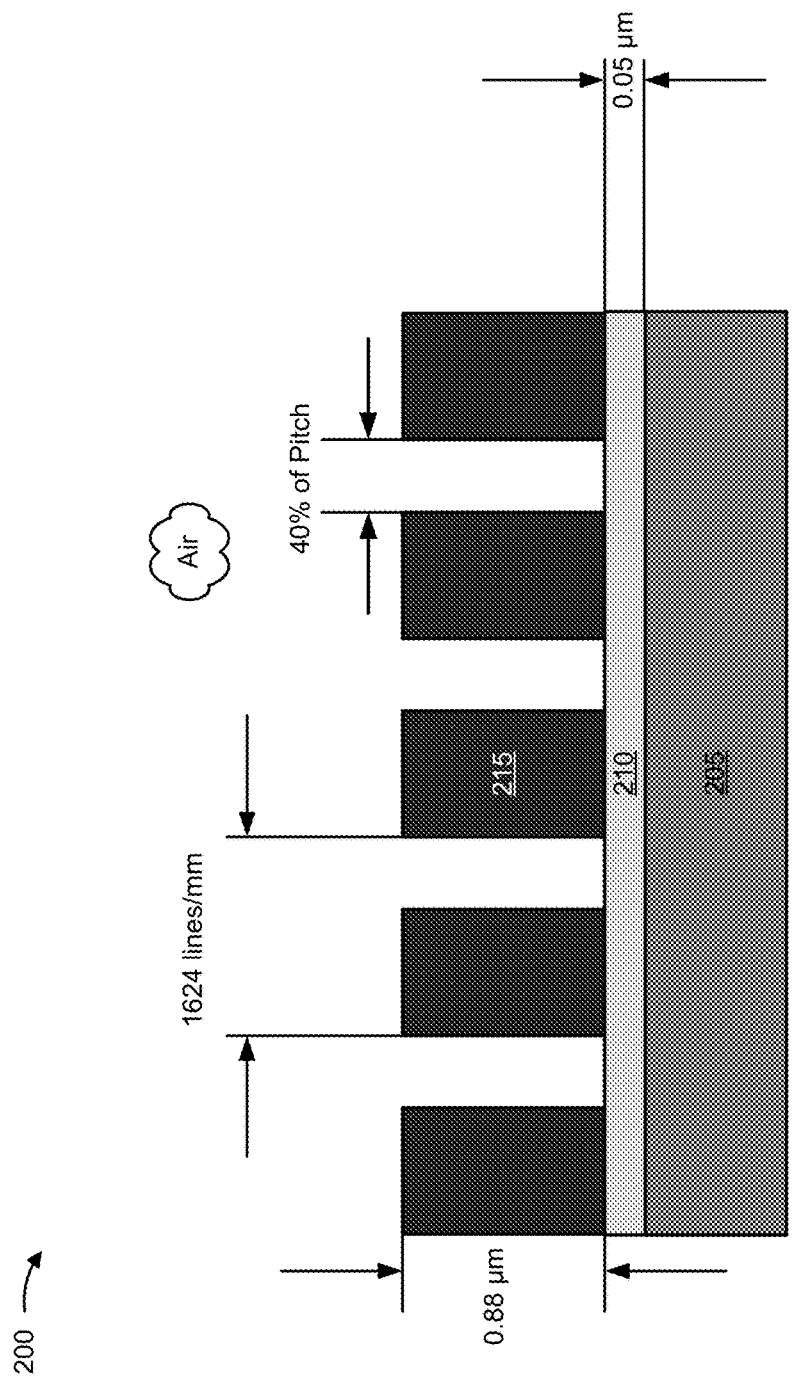

FIG. 3B is a diagram of an example thin film TIR diffraction grating 200 with particular parameters for a thin film grating layer 215 formed of silica, including 1624 lines/mm and an etch stop layer 210 with a thickness of 0.05 microns.

As shown in FIG. 3B, example thin film TIR diffraction grating 200 may include a silicon thin film grating layer 215 with a normalized groove width of 0.4 (i.e., 40% of a grating pitch of example thin film TIR diffraction grating 200 is a groove) and a grating height of 0.88 microns. As further shown in FIG. 3B, thin film TIR diffraction grating 200 may include etch stop layer 210 with a thickness of 0.05 microns.

In some implementations, thin film TIR diffraction grating 200 may be designed based on a design space associated with identifying parameters of thin film grating layer 215 in order to achieve high DE in the $-1^{st}$ order for the TM polarization, and low DE in the $-1^{st}$ order for the TE polarization, as described below with regard to FIG. 3C. The DE in the $-1^{st}$ order for the TM polarization and the TE polarization for a single polarization thin film TIR diffraction grating 200 (e.g., such as that described in FIG. 3B) may depend on a wavelength of incident light. In practice, thin film TIR diffraction grating 200 may include a different number of lines/mm, a different normalized groove width, and/or etch stop layer 210 with a different thickness.

Figure 3C:
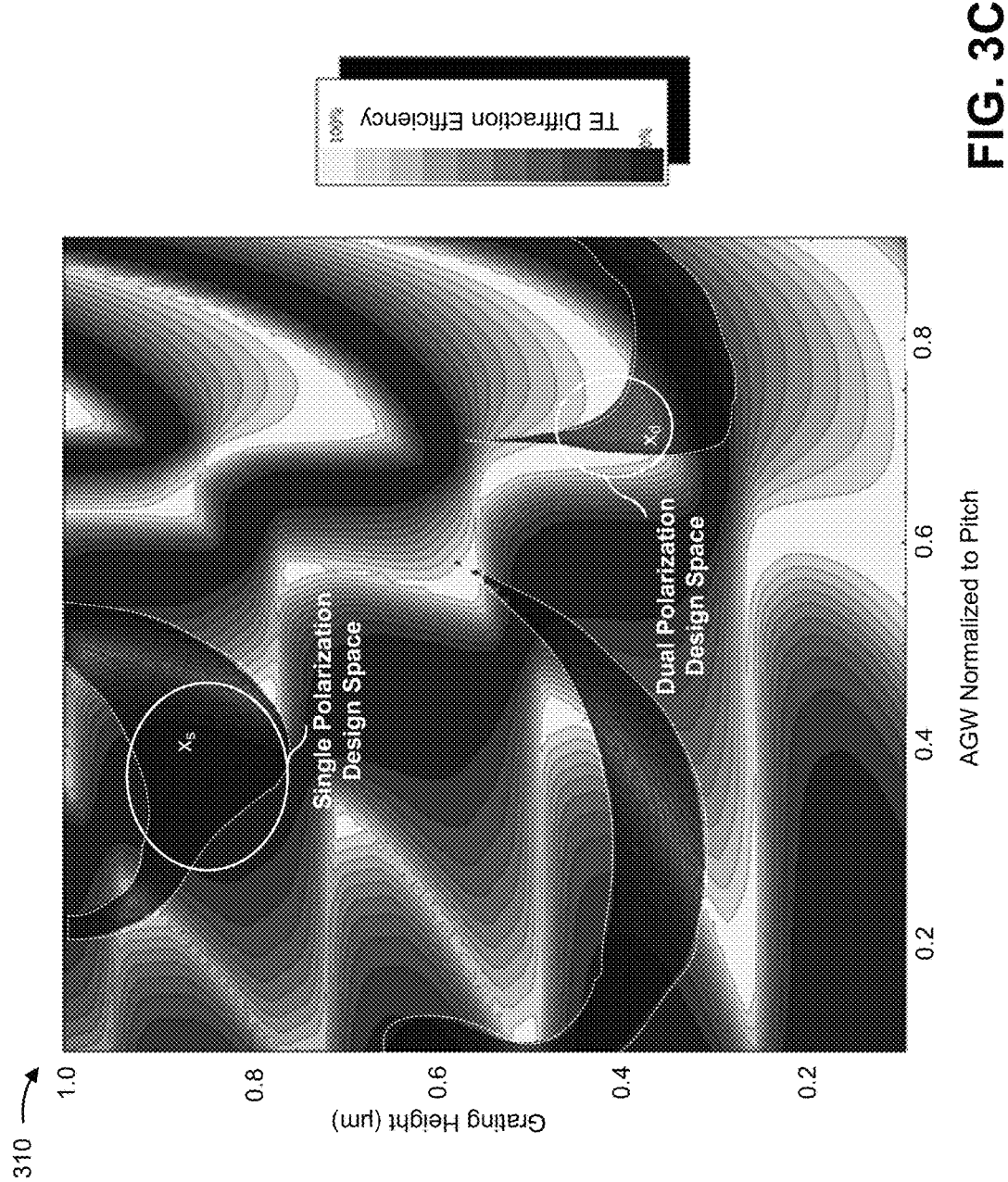

FIG. 3C is a diagram of an example design space 310 associated with identifying parameters (e.g., a normalized groove width, a pitch, a groove width, a grating height) of thin film grating layer 215 for a single polarization thin film TIR diffraction grating 200 or a dual polarization thin film TIR diffraction grating 200. FIG. 3C illustrates DEs, for both the TM polarization and the TE polarization, in the $-1^{st}$ order for a thin film grating layer 215 formed of silicon. Further, example design space 310 corresponds to a wavelength within the C band that results in worst-case polarization design spaces (i.e., smallest polarization design spaces), as described below. It is understood that all other wavelengths in the C band would have design spaces overlapping in the same areas and at least the same size as, if not larger than, the design spaces illustrated in FIG. 3C.

As shown in FIG. 3C, the vertical axis of example design space 310 corresponds to a range of grating heights (e.g., a height of a ridge, a depth of a groove) of thin film grating layer 215 from 0.0 microns to 1.0 micron. As further shown, the horizontal axis of example design space 310 corresponds to a range of groove widths (e.g., air groove width (AGW)) of thin film grating layer 215 that are normalized to a pitch of thin film grating layer 215 (herein referred to as normalized groove widths). In other words, the normalized groove widths correspond to percentage of the pitch of thin film grating layer 215 that is a groove (e.g., rather than a ridge).

As shown by the legend in the right portion of FIG. 3C, the black-to-light gray gradient of example design space 310 represents DEs (e.g., from 0% to 100%) in to the $-1^{st}$ order for the TE polarization within the grating height range and normalized groove width range identified above. As shown, the DE in the $-1^{st}$ order for the TE polarization varies across example design space 310. For example, for a normalized groove width of 0.6, and a grating height of 0.1 microns, the DE in the $-1^{st}$ order for the TE polarization is approximately 100%. Similarly, for a normalized groove width of 0.5, and a grating height of 0.1 microns, the DE in the $-1^{st}$ order for the TE polarization is approximately 50%. Further, for a normalized groove width of 0.2, and a grating height of 0.1 microns, the DE in the $-1^{st}$ order for the TE polarization is approximately 0%.

The transparent black areas (surrounded by white dotted lines in FIG. 3C) represent areas of example design space 310 where DEs in the $-1^{st}$ order for the TM polarization are greater than or equal to 90%. For example, for a normalized groove width of 0.3, and a grating height of 0.35 microns, the DE in the $-1^{st}$ order for the TM polarization is greater than or equal to 90%.

As noted above, FIG. 3C is provided as an example design space 310 for DEs in the $-1^{st}$ order for a thin film grating layer 215 formed of silicon, and corresponds to areas of different DE for TE and TM polarizations of a wavelength within the C band that results in worst-case polarization design spaces. The example design space 310 includes areas of overlap between high DE for the TM polarization and low DE for the TE polarization (e.g., that may be used for designing a single polarization thin film TIR diffraction grating 200) or areas of overlap between high DE for the TM polarization and high DE for the TE polarization (e.g., that may be used for designing a dual polarization thin film TIR diffraction grating 200). Other design spaces (e.g., with wider ranges, smaller ranges, and/or different ranges of grating height and/or normalized groove width) exist for other wavelengths (e.g., within the C band, within the L band, or the like) and/or for thin film grating layers 215 formed of other materials. In other words, example design space 310 is a single example of a possible design space.

In some implementations, the parameters of thin film grating layer 215 may be identified using example design space 310 in order to design thin film grating layer 215 to achieve a desired DE associated with one or both polarizations of light. For example, in a case where thin film grating layer 215 is to achieve high (e.g., greater than or equal to 94%) DE in the $-1^{st}$ order for the TM polarization, and low (e.g., less than 10%, approximately 0%) DE in the $-1^{st}$ order for the TE polarization (i.e., when thin film TIR diffraction grating 200 is designed for a single polarization), parameters of thin film grating layer 215 may be identified based on approximately the area labeled "single polarization design space" in FIG. 3C. Within the single polarization design space, the DE in the $-1^{st}$ order for the TM polarization is high, while DE in the $-1^{st}$ order for the TE polarization is low.

As a particular example, a silicon thin film grating layer 215 with a normalized groove width of 0.4 and a grating height of 0.88 microns (similar to that described above with regard to FIG. 3B, and identified by a point marked as "$x_s$" within the single polarization design space), may achieve high DE in the $-1^{st}$ order for the TM polarization, and low DE in the $-1^{st}$ order for the TE polarization.

Figure 3D:
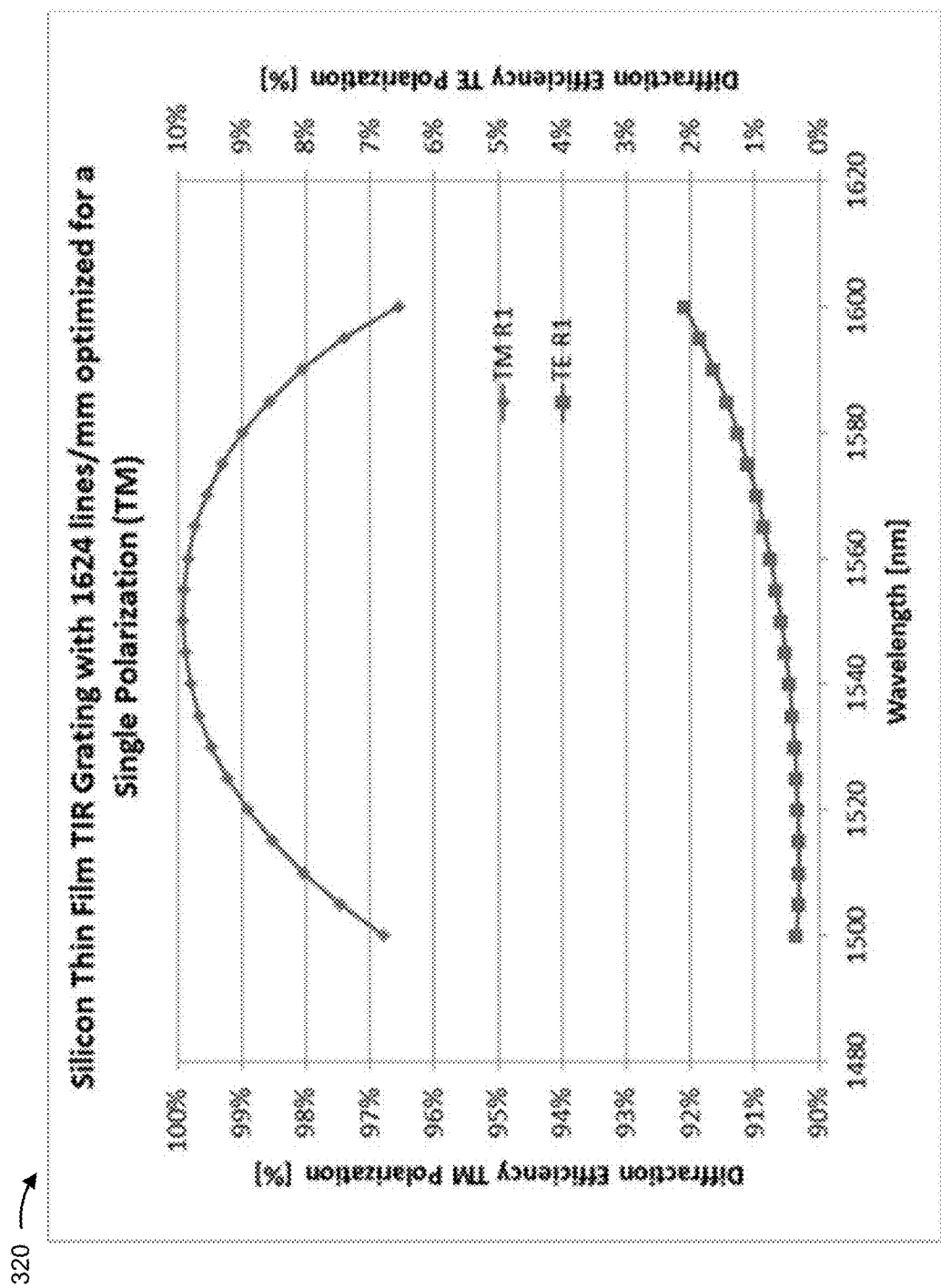

FIG. 3D is a diagram of an example graph 320 that shows DEs in the $-1^{st}$ order for the TM polarization and DEs in the $-1^{st}$ order for the TE polarization for incident light with wavelengths that range from 1500 nm to 1600 nm (i.e., across approximately the C band).

As shown in FIG. 3D (e.g., by the line identified as TM R1, and using the corresponding left vertical axis), the DEs in the $-1^{st}$ order for the TM polarization ranges from approximately 96.8% (e.g., at 1500 nm and 1600 nm) to approximately 99.9% (e.g., at approximately 1550 nm). As further shown (e.g., by the line identified as TE R1, and using the corresponding right vertical axis), the DEs in the $-1^{st}$ order for the TE polarization range from approximately 0.4% (e.g., at 1500 nm) to approximately 2.1% (e.g., at 1600 nm). Thus, as illustrated in FIG. 3D, a DE in the $-1^{st}$ order for the TM polarization exceeding approximately 99% can be readily achieved in the C band. This may allow insertion loss to be improved by approximately 0.4 dB to approximately 0.6 dB (e.g., as compared to prior diffraction grating 100). As also illustrated, a DE in the $-1^{st}$ order for the TE polarization that is less than approximately 1% can be achieved in the C band, which corresponds to an improvement of approximately 5% as compared to prior diffraction grating 100.

Returning to FIG. 3C, in a case where thin film grating layer 215 is to achieve high (e.g., greater than or equal to 94%) DE in the $-1^{st}$ order for the TM polarization, and high DE in the $-1^{st}$ order for the TE polarization (i.e., when thin film TIR diffraction grating 200 is designed for dual polarization), parameters of thin film grating layer 215 may be identified from approximately the area labeled "dual polarization design space" in FIG. 3C. Within the dual polarization design space, DE in the $-1^{st}$ order for the TM polarization is high, and DE in the $-1^{st}$ for the TE polarization is high. In a case where thin film TIR diffraction grating 200 is to minimize polarization dependent loss (PDL), thin film grating layer 215 may be designed for dual polarization blazing (e.g., since high DE is achieved for both polarizations, losses that depend on polarization are reduced).

Figure 3E:
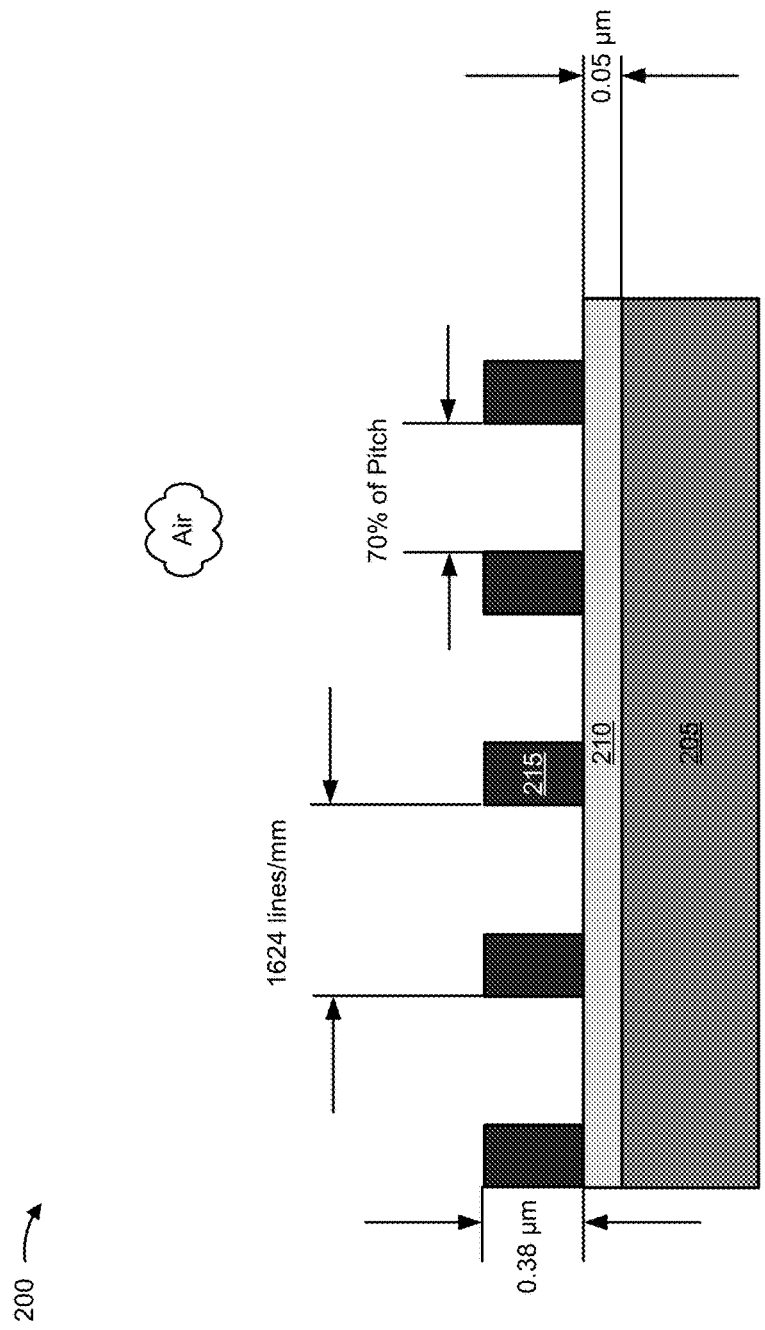

As a particular example, a thin film grating layer 215 with a normalized groove width of 0.7 (e.g. 70% of pitch) and a grating height of 0.38 microns (identified by a point marked as "$x_d$" within the dual polarization design space), may achieve high DE in the $-1^{st}$ order for the TM polarization, and high DE in the $-1^{st}$ order for the TE polarization. FIG. 3E is a diagram of an example thin film TIR diffraction grating 200 with these parameters for a thin film grating layer 215 with 1624 lines/mm and an etch stop layer 210 with a thickness of 0.05 microns. In practice, thin film TIR diffraction grating 200 may include a different number of lines/mm and/or etch stop layer 210 with a different thickness.

Figure 3F:
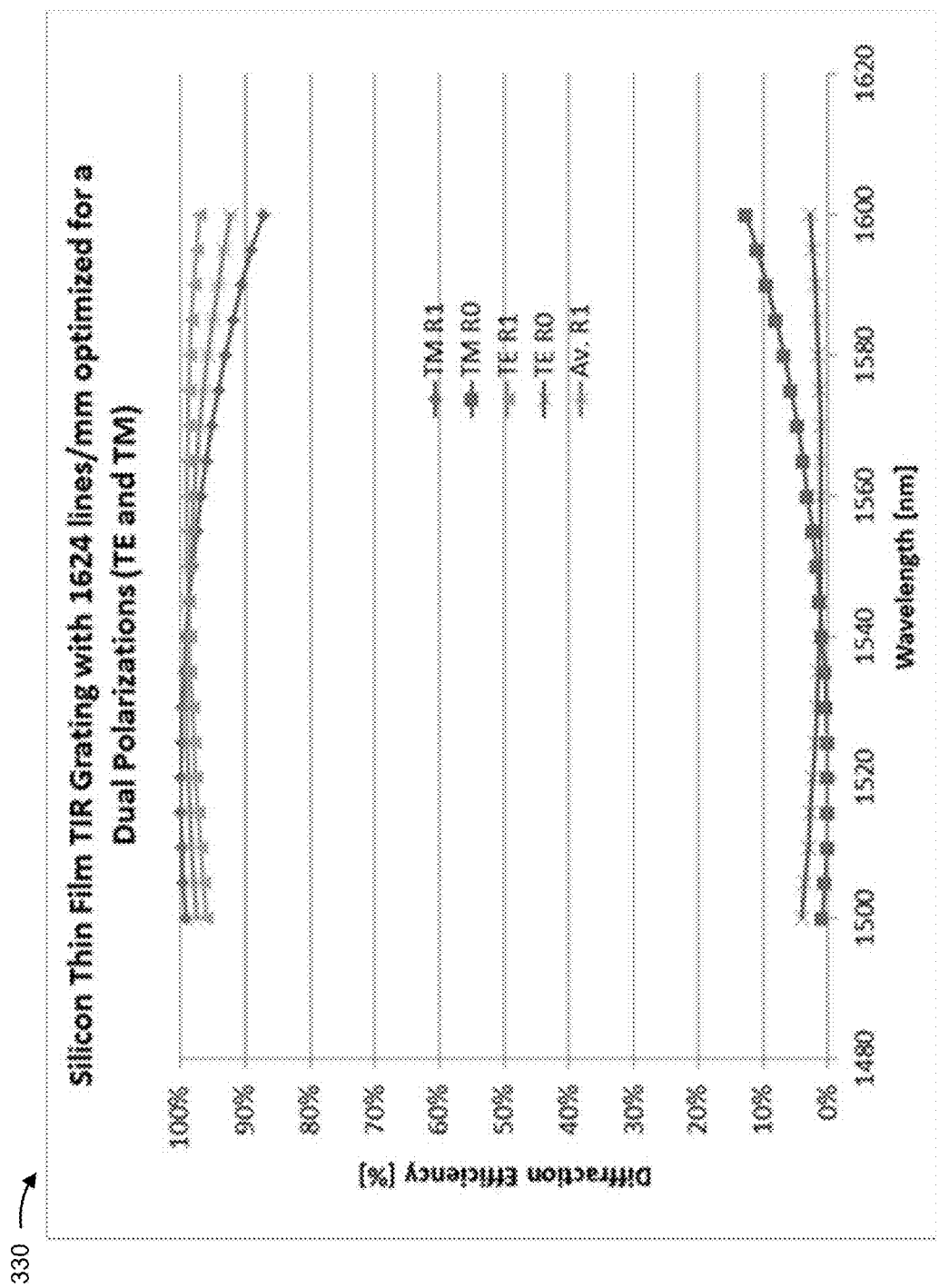

The DE in the $-1^{st}$ order for the TM polarization and the TE polarization for a dual polarization thin film TIR diffraction grating 200 (e.g., such as that described in FIG. 3E) may depend on a wavelength of incident light. FIG. 3F is a diagram of an example graph 330 that shows DEs in the $-1^{st}$ order for the TM polarization, DEs in the $-1^{st}$ order for the TE polarization, and an average DE in the $-1^{st}$ order (i.e., an average of the DE for the TM polarization and the TE polarization, shown by the line identified as "Av. R1"), for incident light with a wavelength in a range from 1500 nm to 1600 nm. FIG. 3F also shows DEs in the $0^{th}$ order for both the TM and TE polarizations (shown by the lines identified as "TM R0" and "TE R0", respectively).

As shown in FIG. 3F (e.g., by the line identified as "TM R1"), the DE in the $-1^{st}$ order for the TM polarization ranges from approximately 88% (e.g., at 1600 nm) to approximately 100% (e.g., at approximately 1520 nm). As further shown (e.g., by the line identified as "TE R1"), the DE in the $-1^{st}$ order for the TE polarization ranges from approximately 95.0% (e.g., at 1500 nm) to approximately 99.0% (e.g., at approximately 1560 nm). As such, high DE in the $-1^{st}$ order for both the TE polarization may be achieved, with relatively low DE in the $0^{th}$ order for both the TM and TE polarizations (e.g., less than approximately 12% and 5% for the TM polarization and the TE polarization, respectively).

Thus, as illustrated in FIG. 3F, a DE in the $-1^{st}$ order exceeding 95% can be readily achieved for both the TM polarization and the TE polarization in the C band. This corresponds to a worst-case insertion loss of approximately –0.14 dB, and a worst-case PDL of approximately 0.16 dB.

Notably, FIGS. 3A-3F are provided merely as examples, and other examples are possible that may differ from those described in association with FIGS. 3A-3F. For example, thin film grating layer 215 may include additional or fewer lines/mm, may be formed of a different material, or the like. As another example, thin film TIR diffraction grating 200 may include an etch stop layer 210 with a different thickness, may include additional and/or different layers (e.g., marker layer 225, encapsulation layer 230, as described below), may be designed for high DE in a different order (e.g., the $0^{th}$ order), may be designed for use for light in a larger range of wavelengths, a smaller range of wavelength, or a different range of wavelengths (e.g., the L band), or the like. In other words, FIGS. 3A-3F are merely examples associated with possible thin film TIR diffraction gratings that operate based on TIR while achieving high DE for the TM polarization and/or the TE polarization.

Figure 4:
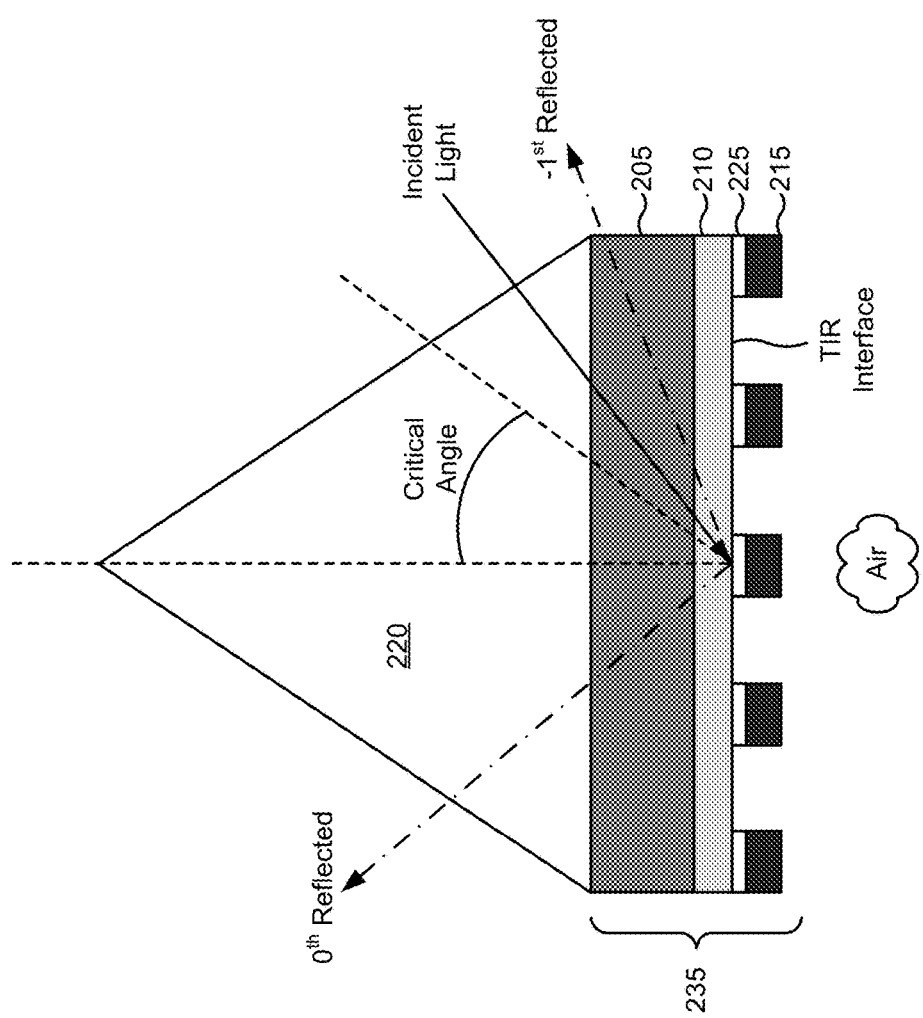
FIG. 4 is a diagram of a second example implementation of a thin film diffraction grating designed to operate based on TIR.

FIG. 4 is a diagram of a second example implementation of a thin film diffraction grating 235 designed to operate based on TIR. As shown in FIG. 4, thin film TIR diffraction grating 235 may include substrate 205, etch stop layer 210, thin film grating layer 215, and a marker layer 225. As shown, thin film TIR diffraction grating 235 may be attached to optical element 220 (e.g., in order to form a grism). As illustrated in FIG. 4, the diffraction grating 235 is attached to optical element 220 by the side of the substrate 205 opposite to the thin film grating layer 215 (e.g., the bottom of the substrate 205).

As shown, thin film TIR diffraction grating 235 may have a structure that is similar to thin film TIR diffraction grating 200 (e.g., a similar arrangement of substrate 205, etch stop layer 210, and thin film grating layer 215). In addition to these layers, thin film TIR diffraction grating 235 may include marker layer 225 disposed between etch stop layer 210 and thin film grating layer 215.

Marker layer 225 includes a layer associated with signaling, indicating, and/or identifying an etch end-point (e.g., a point at which etching should stop) during etching of the thin film dielectric material from which thin film grating layer 215 is formed. In some implementations, marker layer 225 may be formed of an etchable material, such as silicon, silicon nitride ($Si_3N_4$), tantala, or the like. In some implementations, marker layer 225 may have a thickness that is less than approximately 0.1 micron, such as 50 nm.

In some implementations, manufacturability of thin film TIR diffraction grating 235 may be improved by marker layer 225 (e.g., as compared to manufacturability of thin film TIR diffraction grating 200). For example, grooves may be etched (e.g., toward substrate 205) in the thin film dielectric layer in order to form thin film grating layer 215. In a typical RIE etching process (e.g., one that uses fluorine based chemistry), when the etching reaches substrate 205, reactants produced by the etching (e.g., silicon fluoride (SiF), C—N, tantalum flouride (TaF) are detected by a mass spectrometer associated with an etch chamber. Here, when the mass spectrometer detects an increase, a spike, a peak, or the like, in an amount of the reactants being produced (e.g., due to the etching reaching and penetrating substrate 205), the mass spectrometer causes etching to stop. In other words, the mass spectrometer detects the etch end-point based on the reactants produced when the etching penetrates substrate 205, rather than by monitoring an amount of time that etching is performed.

However, since etch stop layer 210 layer is resistant to etching, as described above, the reactants needed to detect the etch end-point are not produced (e.g., since the etching does not penetrate substrate 205). In such a case, time-based etching may be used. However, precise timing, through etch rate calibration, may be employed in order to determine the end-point. Due to natural variations in an etch rate of a particular etching chamber, and variations in etch rates between different etching chambers, such timing is difficult to ensure for different etches (e.g., different etches using a same chamber, different etches using different chambers). Thus, over-etching of thin film grating layer 215 in a lateral direction (e.g., into sidewalls of the ridges) and/or under etching of thin film grating layer 215 may result during a given time-based etch. Such etch variations will impact an overall etch process yield since grating profile tolerances cannot be reliably achieved. In other words, the etching process may not be repeatable using the time-based approach.

Marker layer 225 may improve manufacturability of thin film TIR diffraction grating 235 by permitting the reactant detection-based etching technique, described above, to be used for etching the dielectric layer, from which thin film grating layer 215 is formed, when thin film TIR diffraction grating 235 includes etch stop layer 210. For example, marker layer 225 may be formed of silica or silicon nitride.

Here, when the etching reaches and penetrates marker layer 225, the reactant (e.g., silicon fluoride) may be produced due to the penetration of marker layer 225. In other words, the etching of marker layer 225 may cause marker layer 225 to signal or indicate the etch end-point (by producing the detectable reactant). As such, a mass spectrometer may be capable of detecting an increase, a spike, or a peak in an amount of the reactant, and may cause the etching to stop, accordingly. This may improve manufacturability of thin film TIR diffraction grating 235 by ensuring that grating profile tolerances can be reliably achieved in a repeatable manner.

The heights, widths, and thicknesses of layers shown in FIG. 4 are provided as examples, and are exaggerated for illustrative purposes. In practice, thin film TIR diffraction grating 235 may include additional layers, fewer layers, different layers, or differently arranged layers than those shown in FIG. 4.

Figure 5A:
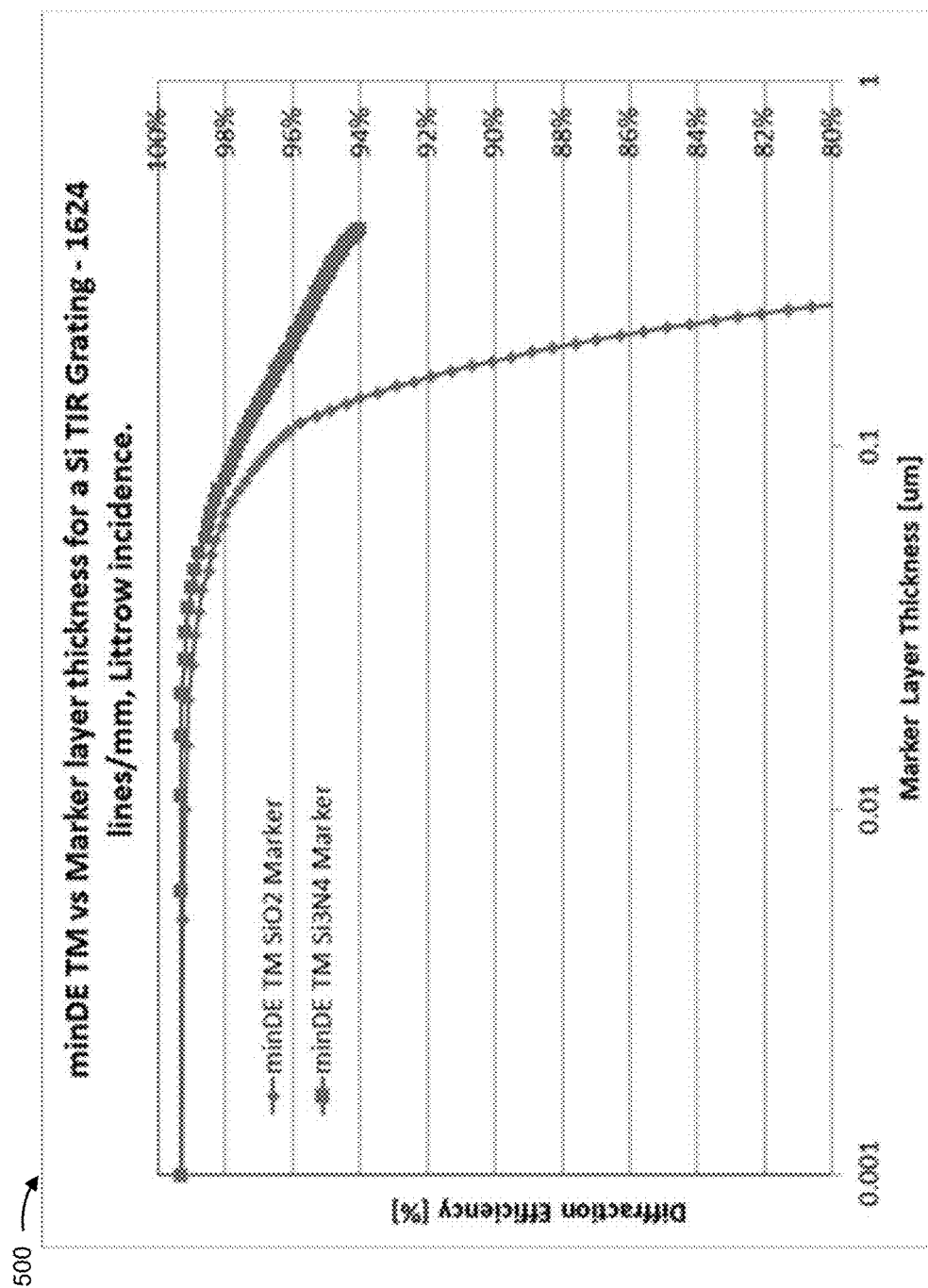
FIGS. 5A-5C are diagrams associated with design and performance of the second example implementation of FIG. 4.

In some implementations, a DE of thin film TIR diffraction grating 235 may not be significantly impacted due to the inclusion of marker layer 225 in thin film TIR diffraction grating 235. FIG. 5A is a diagram of an example graph 500 that shows the DE in the $-1^{st}$ order for the TM polarization for thin film TIR diffraction grating 235 including marker layer 225, formed of silica and silicon nitride, with thickness that ranges from 0.001 microns to approximately 0.8 microns. As noted, FIG. 5A corresponds to a silicon thin film grating layer 215 with a pitch having 1624 lines/mm, and arranged in Littrow mount.

As shown in FIG. 5A (by the line identified as "minDE TM SiO2 Marker"), when marker layer 225 is formed of silica, the DE in the $-1^{st}$ order for the TM polarization is greater than 98% when the thickness of marker layer 225 is less than or equal to approximately 0.065 microns, and is greater than 99% when the thickness of marker layer 225 is less than or equal to approximately 0.025 microns.

Similarly (as shown by the line identified as "minDE TM Si3N4 Marker"), when marker layer 225 is formed of silicon nitride, the DE in the $-1^{st}$ order for the TM polarization is greater than 98% when the thickness of marker layer 225 is less than or equal to approximately 0.81 microns, and is greater than or equal to 99% when the thickness of marker layer 225 is less than or equal to approximately 0.041 microns.

Notably, a roll-off in the DE that results from a silicon nitride marker layer 225 is less dramatic than that of a silica marker layer 225 (e.g., when the thickness of marker layer 225 exceeds 0.1 micron). However, as illustrated, when marker layer 225 is less than or equal to approximately 0.05 microns (50 nm), the DE in the $-1^{st}$ order is not significantly affected, regardless of whether marker layer 225 is formed of silica or silicon nitride.

Thus, in some implementations, marker layer 225 may be deposited in a grating area of thin film TIR diffraction grating 235. In other words, during manufacture of thin film TIR diffraction grating 235, marker layer 225 may be deposited within a chip boundary (i.e., in an on-chip area) of substrate 205 (e.g., a wafer) on which thin film TIR diffraction grating 235 is formed. Here, portions of marker layer 225 remain in the ridges of thin film TIR diffraction grating 235 and are disposed between thin film grating layer 215 and etch stop layer 210 (e.g., as shown in FIG. 4).

Additionally, or alternatively, marker layer 225 may be deposited in an off-chip area (e.g., a process control monitoring (PCM) region, an area outside of the chip boundary) of substrate 205 on which thin film TIR diffraction grating 235 is formed (e.g., rather than being deposited in the on-chip area, or in addition to being deposited in the on-chip area).

Figure 5B:
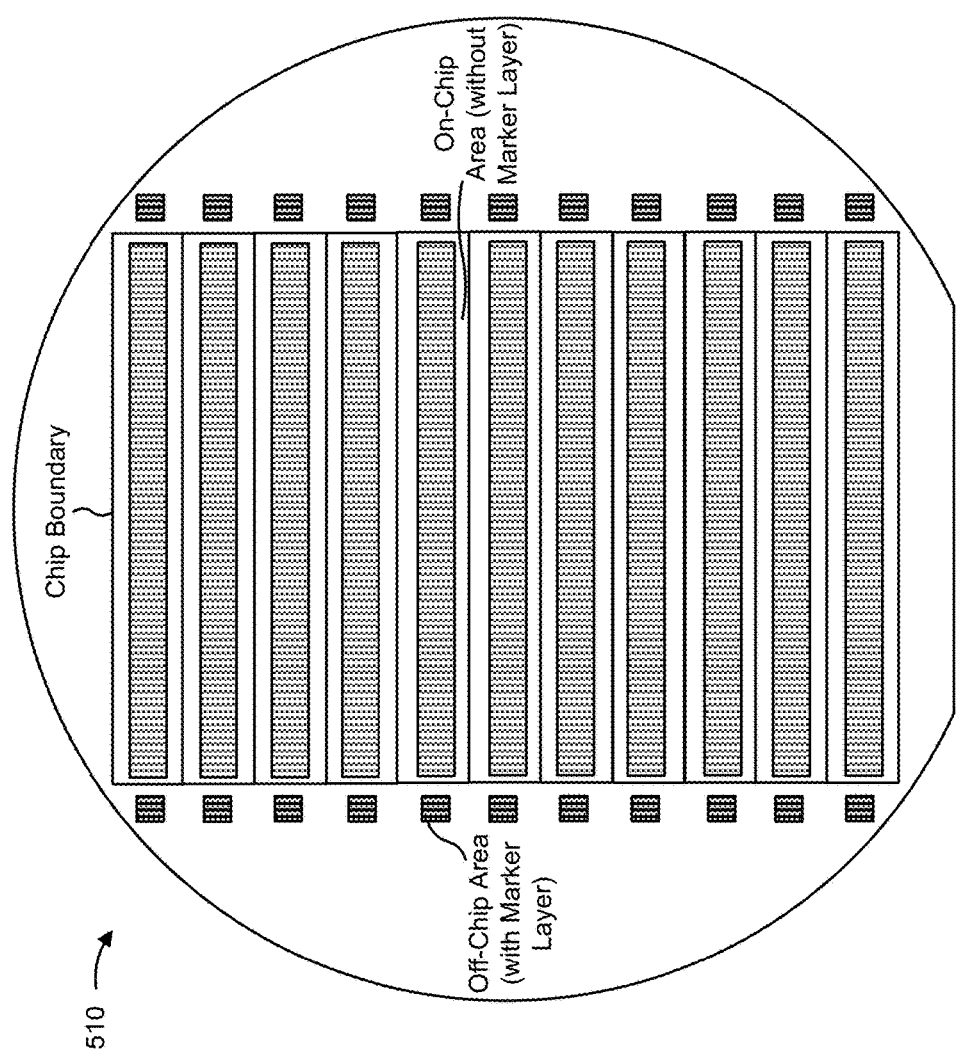

FIG. 5B is a diagram of an example wafer 510 that shows marker layer 225 as being deposited in an off-chip area of a wafer on which multiple thin film TIR diffraction gratings 235 are formed. As shown in FIG. 5B, on example wafer 510, marker layer 225 may be deposited in off-chip areas adjacent to ends of each chip boundary. As noted in FIG. 5B, in this example, marker layer 225 is not deposited within chip boundaries (i.e., is not deposited in on-chip areas) of wafer 510. Here, wafer 510 may be masked such that etching takes place within grating areas (e.g., identified by white areas with vertical lines) inside the chip boundaries, and within the off-chip areas where marker layer 225 is present (e.g., identified by gray areas with vertical lines). Here, when the etching penetrates marker layer 225 in the off-chip areas, reactants detectable by a mass spectrometer may be produced (i.e., marker layer 225 may signal or indicate the etch end-point), and etching may be stopped, as described above. In this example, the resulting thin film TIR diffraction grating will not include marker layer 225, and may be similar to thin film TIR diffraction grating 200 described above with regard to FIG. 2.

Figure 5C:
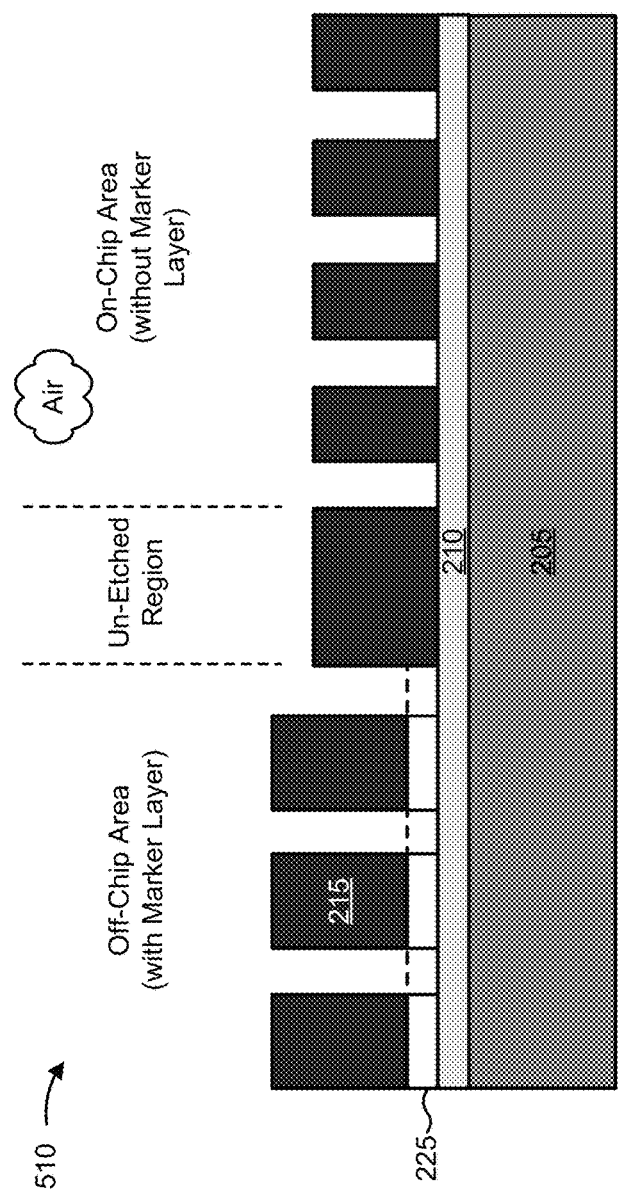

FIG. 5C is a partial cross section of example wafer 510 that includes marker layer 225 in off-chip areas, and does not include marker layer 225 in on-chip areas. As shown, marker layer 225 is present in an off-chip area (e.g., outside of a chip boundary), and is not present in an on-chip area (e.g., within the chip boundary). As further shown, in some implementations, wafer 510 may include an un-etched region between the off-chip area with marker layer 225 and the on-chip area without marker layer 225.

Notably, FIGS. 5A-5C are provided merely as examples, and other examples are possible that may differ from those described in association with FIGS. 5A-5C. For example, thin film grating layer 215 may include additional or fewer lines/mm, may be formed of a different material, or the like. As another example, thin film TIR diffraction grating 235 may include an etch stop layer 210 and/or marker layer 225 with a different thickness, may include additional and/or different layers (e.g., encapsulation layer 230, as described below), may be designed for high DE in a different order (e.g., the $-2^{nd}$ order, the $-3^{rd}$ order), may be designed for use with light in a larger range of wavelengths, a smaller range of wavelength, a different range of wavelengths, or the like. As an additional example, marker layer 225 may be included in an on-chip area that is off of thin film TIR diffraction gratings 235. In other words, FIGS. 5A-5C are merely examples associated with possible thin film TIR diffraction gratings that operate based on TIR while achieving high DE for the TM polarization and/or the TE polarization, and are manufactured using a marker layer associated with indicating an etch end-point.

Figure 6A:
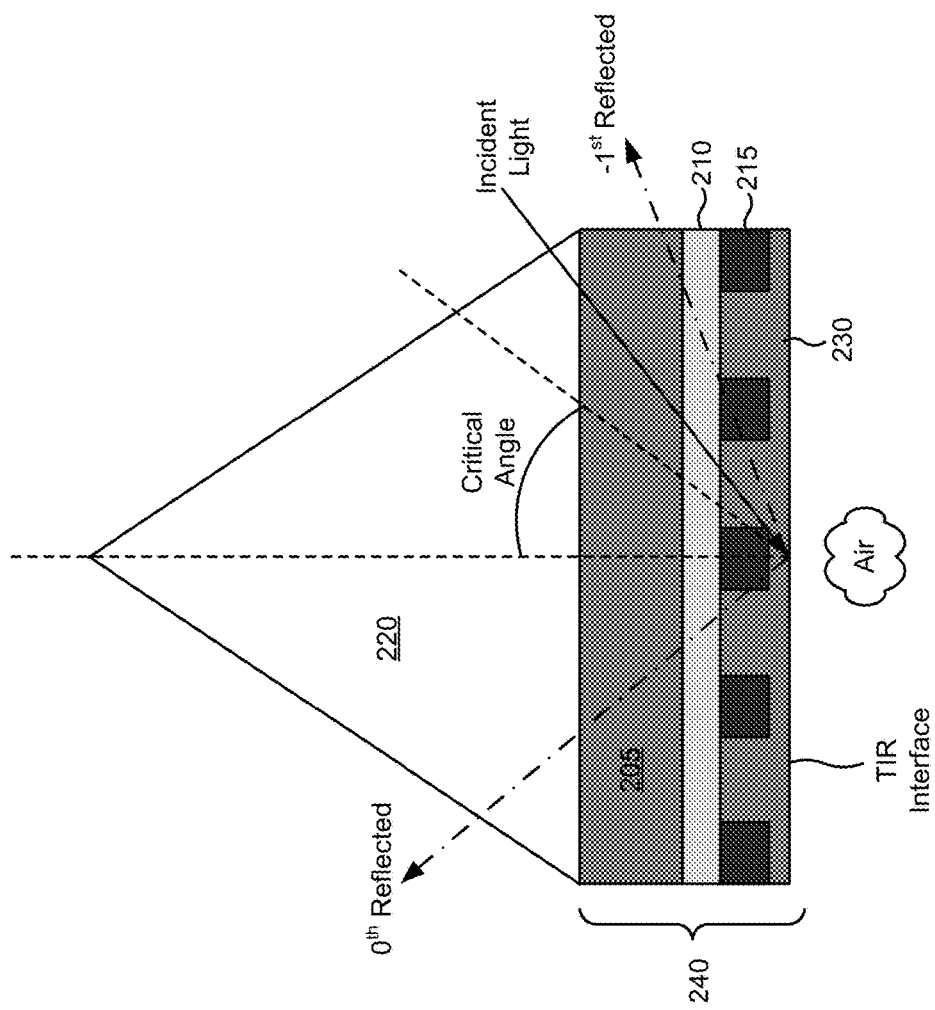
FIGS. 6A and 6B are diagrams of third and fourth example implementations of thin film diffraction gratings designed to operate based on TIR.
Figure 6B:
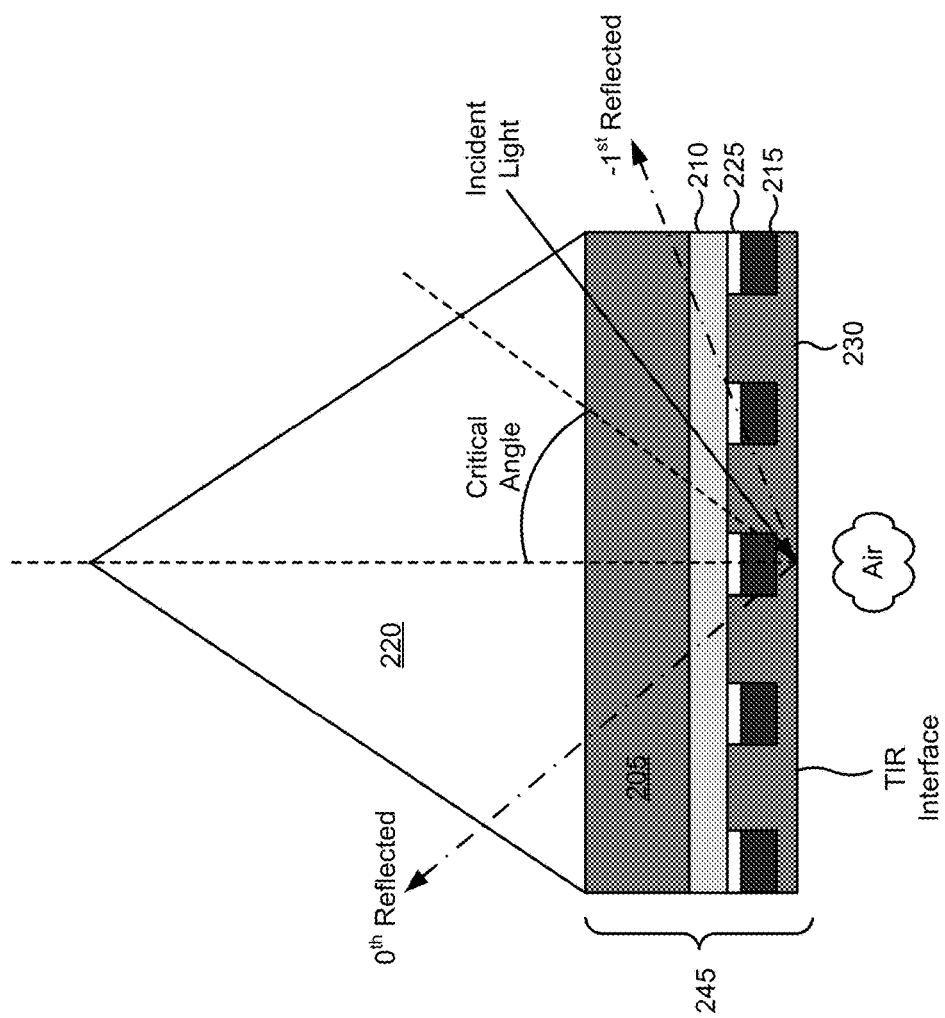

FIGS. 6A and 6B are diagrams of example implementations of thin film diffraction gratings 240 and 245, respectively, designed to operate based on TIR. As shown in FIG. 6A, thin film TIR diffraction grating 240 includes substrate 205, etch stop layer 210, thin film grating layer 215, and an encapsulation layer 230. As shown, thin film TIR diffraction grating 240 may be attached to optical element 220 (e.g., in order to form a grism).

As shown, thin film TIR diffraction grating 240 may have a structure that is similar to thin film TIR diffraction grating 200 (e.g., a similar arrangement of substrate 205, etch stop layer 210, and thin film grating layer 215). In addition to these layers, thin film TIR diffraction grating 240 includes encapsulation layer 230.

Encapsulation layer 230 includes a permanent layer designed to cover, encapsulate, and/or protect thin film grating layer 215 of thin film TIR diffraction grating 240. In some implementations, encapsulation layer 230 may be formed of a hard, scratch resistant dielectric material, such as fused silica, glass (e.g., spin-on glass, atomic layer deposition (ALD) deposited $SiO_2$), or the like. As shown in FIG. 6A, a thickness of encapsulation layer 230 may be greater than a thickness of thin film grating layer 215 (e.g., a height of a ridge of thin film grating layer 215).

In some implementations, encapsulation layer 230 may prevent thin film grating layer 215 from being touched, damaged, scratched, contaminated, or otherwise contacted, during, for example, grism assembly (e.g., during bonding step, a polishing step, when integrating the grating or grism into an opto-mechanics/optical bench, or the like), shipping, handling by a person, or the like. Here, use of encapsulation layer 230 eliminates a need to apply a removable protective material (e.g., Canada Balsam, a protective paint) to thin film grating layer 215, which may be advantageous since the removable protective material may not fully protect thin film grating layer 215, may be difficult to remove, or may cause damage during removal/cleaning, or the like.

Moreover, encapsulation layer 230 may be polished, without damaging thin film grating layer 215, in order to flatten or planarize an encapsulation surface (e.g., the lowermost surface of thin film TIR diffraction grating 240 as shown in FIG. 6A) of thin film TIR diffraction grating 240. For example, due to the use of encapsulation layer 230, the TIR interface of thin film TIR diffraction grating 240 is located at the encapsulation surface of encapsulation layer 230, as shown in FIG. 6A (e.g., rather than a bottom of etch stop layer 210 as with thin film TIR diffraction gratings 200 and 235). Thus, the encapsulation surface of thin film TIR diffraction grating 240 may be flattened or planarized in order to prevent a reduction in the DE that would result from a non-planar or rough TIR interface. Here, the encapsulation surface of thin film TIR diffraction grating 240 may be manipulated, touched, polished, and cleaned, without risk of damage to thin film grating layer 215 that would negatively affect the DE of thin film TIR diffraction grating 240. In some implementations, sides of the grating chip may be polished in order to coincide with sides of prism 22 to form an input surface for an optical beam.

Furthermore, encapsulation layer 230 allows removable protective material to be applied to the now planar encapsulation surface that can be readily removed (e.g., with a typical swab and solvent cleaning process).

In some implementations, a thin film TIR diffraction grating may include marker layer 225 and encapsulation layer 230. For example, as shown in FIG. 6B, thin film TIR diffraction grating 245 may include substrate 205, etch stop layer 210, thin film grating layer 215, marker layer 225, and encapsulation layer 230. As shown, thin film TIR diffraction grating 245 may have a structure that is similar to thin film TIR diffraction grating 235 (e.g., a similar arrangement of substrate 205, etch stop layer 210, thin film grating layer 215, and marker layer 225).

The heights, widths, and thicknesses of layers shown in FIGS. 6A and 6B are provided as examples, and are exaggerated for illustrative purposes. In practice, thin film TIR diffraction grating 240 and/or thin film TIR diffraction grating 245 may include additional layers, fewer layers, different layers, or differently arranged layers than those shown in FIGS. 6A and 6B.

Figure 7A:
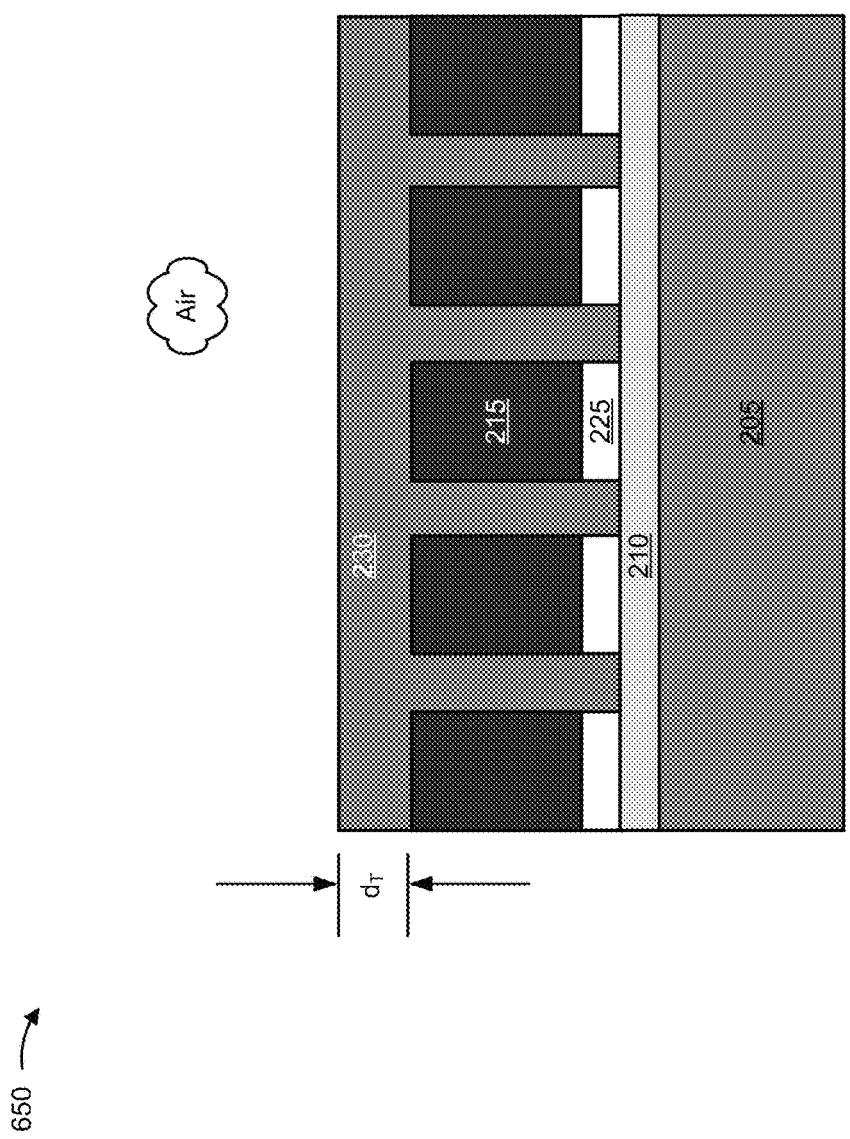
FIGS. 7A-7C are diagrams associated with design and performance of the fourth example implementation of FIG. 6B.

In some implementations, the DE of thin film TIR diffraction grating 245 may depend on, but may not be significantly impacted by, a thickness of encapsulation layer 230. FIG. 7A is a diagram of thin film TIR diffraction grating 245 that includes encapsulation layer 230 with a thickness that is greater than a thickness of thin film grating layer 215. As shown, a difference in thickness between encapsulation layer 230 and thin film grating layer 215 is identified as a distance $d_T$.

Figure 7B:
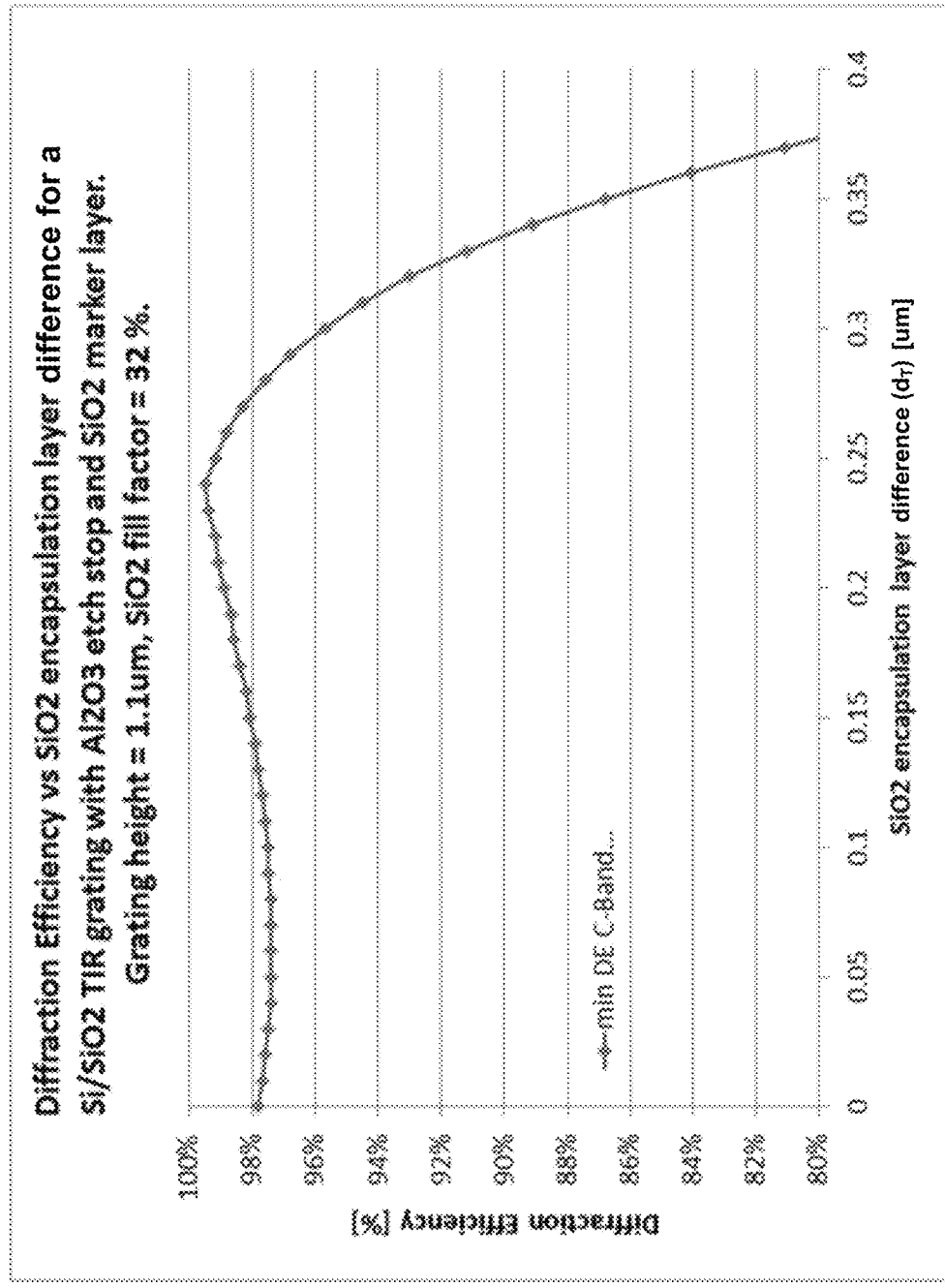

FIG. 7B is a diagram of an example graph 710 that shows DE in the $-1^{st}$ order for the TM polarization for thin film TIR diffraction grating 245 including encapsulation layer 230 with thickness differences ($d_T$) that range from 0.00 microns to approximately 0.37 microns. As noted, FIG. 7B corresponds to a thin film TIR diffraction grating 245 that includes a silica encapsulation layer 230, a silicon or silica thin film grating layer 215, an aluminum oxide etch stop layer 210, and a silica marker layer 225. Further, FIG. 7B shows the DE in the $-1^{st}$ order for the TM polarization, and corresponds to a wavelength within the C band that results in worst-case DE (i.e., the DE may be the same or higher for other wavelengths in the C band).

As shown in FIG. 7B (by the line identified as "min DE C-Band . . . "), when $d_T$ is 0.0 microns (i.e., when encapsulation layer 230 is a same thickness as thin film grating layer 215), the DE in the $-1^{st}$ order for the TM polarization is approximately 98%, which is approximately a 1% decrease as compared to a thin film TIR diffraction grating 240 without encapsulation layer 230. As shown, for a $d_T$ that is between 0.0 microns and approximately 0.15 microns, the DE is further decreased (i.e., below 98%). However, as shown, for a $d_T$ that is between approximately 0.15 microns and approximately 0.28 microns, the DE is recovered (i.e., to at least 98%), with a peak DE of approximately 99.5% when $d_T$ is approximately equal to 0.25 microns. In other words, thin film TIR diffraction grating 245 may have increased DE as compared to thin film TIR diffraction grating 235. As further shown, for a $d_T$ that is greater than approximately 0.28 microns, the DE is again decreased, and there exists a significant DE roll-off.

FIGS. 7A and 7B are provided merely as examples, and other examples are possible that may differ from those described in association with FIGS. 7A and 7B. For example, thin film grating layer 215 may include additional or fewer lines/mm, may be formed of a different material, or the like. As another example, thin film TIR diffraction grating 235 may include an etch stop layer 210, a marker layer 225, and/or an encapsulation layer 230 with a different thickness, may include additional and/or different layers, may be designed for high DE in a different order (e.g., the $-2^{nd}$ order, the $-3^{rd}$ order), may be designed for use with light in a larger range of wavelengths, a smaller range of wavelength, or a different range of wavelengths, or the like. In other words, FIGS. 7A and 7B are merely examples associated with possible thin film TIR diffraction gratings that operate based on TIR while achieving high DE for the TM polarization and/or the TE polarization, and include an encapsulation layer associated with protecting a thin film grating layer.

Figure 7C:
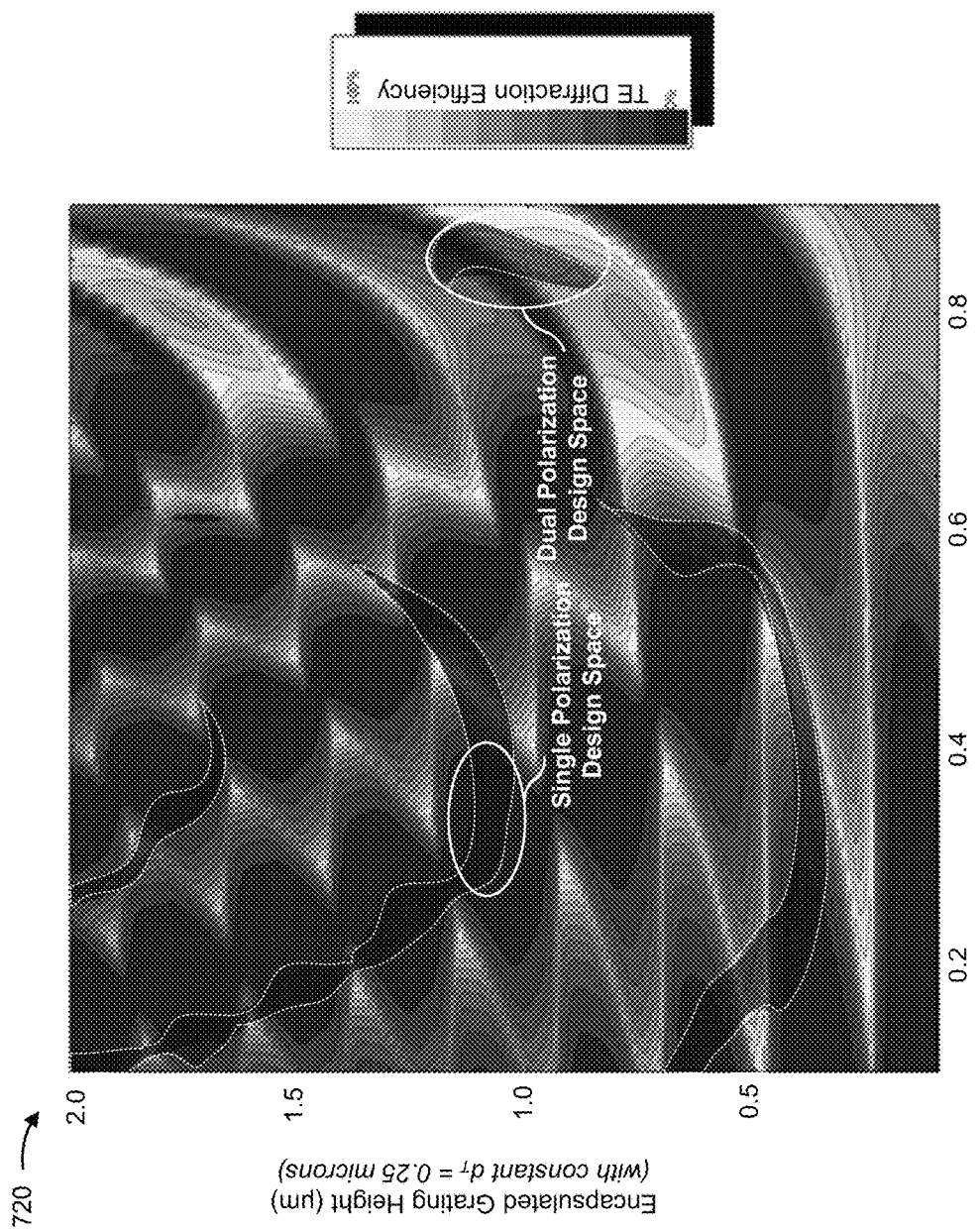

FIG. 7C is a diagram of an example design space 720 associated with identifying parameters (e.g., a normalized groove width, a pitch, a groove width, a grating height) of a single polarization thin film TIR diffraction grating 245 or a dual polarization thin film TIR diffraction grating 245, where $d_T$ is equal to 0.25 microns. FIG. 7C illustrates DEs, for both the TM polarization and the TE polarization, in the $-1^{st}$ order for a thin film grating layer 215 formed of silicon. Further, example design space 720 corresponds to a wavelength within the C band that results in worst-case polarization design spaces (i.e., smallest polarization design spaces).

As shown in FIG. 7C, the vertical axis of example design space 720 corresponds to a range of encapsulated grating heights (e.g., a varying thickness of thin film grating layer 215 plus a constant $d_T$ of approximately 0.25 microns) from 0.0 microns to 2.0 microns. As further shown, the horizontal axis of example design space 720 corresponds to a range normalized groove widths from 0.0 to 1.0.

As shown by the legend in the right portion of FIG. 7C (and similar to example design space 310 described above), the black-to-light gray gradient of example design space 720 represents DEs (e.g., from 0% to 100%) in the $-1^{st}$ order for the TE polarization within the encapsulated grating height range and normalized groove width range identified above. The transparent black areas (surrounded by white dotted lines in FIG. 7C) represent areas of example design space 720 where DEs in the $-1^{st}$ order for the TM polarization are greater than or equal to 90%.

In some implementations, the parameters (e.g., a normalized groove width, a pitch, a groove width, a grating height including $d_T$) of thin film TIR diffraction grating 245 may be identified using example design space 720 and/or in order to achieve a desired DE associated with one or both polarizations of light, in a manner similar to that described above with regard to example design space 310.

As illustrated by example design space 720, a single polarization design space region occurs for thin film TIR diffraction grating 245 with an encapsulated grating height equal to approximately 1.1 microns, which is approximately 0.2 microns thicker than the single polarization design space for thin film TIR diffraction grating 200 associated with example design space 310. Additionally, as shown, a dual polarization design space also exists for a 1.1 micron encapsulated grating height. Thus, in some implementations, a same grating height may be employed to realize a single polarization thin film TIR diffraction grating 245 or a dual polarization thin film TIR diffraction grating 245, which may reduce manufacturing costs. In other words, it is possible to manufacture wafers with the same grating height and then process them differently, masking different groove widths associated with the different design spaces.

As noted above, FIG. 7C is provided as an example design space 720 for DEs in the $-1^{st}$ order for a thin film grating layer 215 formed of silicon, and corresponds to a wavelength within the C band that results in worst-case polarization design spaces (i.e., areas of overlap between high DE for the TM polarization and low DE for the TE polarization, areas of overlap between high DE for the TM polarization and high DE for the TE polarization). Other design spaces (e.g., with wider ranges, smaller ranges, and/or different ranges of grating height and/or normalized groove width) exist for other wavelengths (e.g., within the C band, within the L band, or the like) and/or thin film grating layers 215 formed of other materials. In other words, example design space 720 is a single example of a possible design space.

FIG. 7C is merely an example associated with possible thin film TIR diffraction gratings that operate based on TIR while achieving high DE for the TM polarization and/or the TE polarization, and include an encapsulation layer associated with protecting a thin film grating layer.

Figure 8:
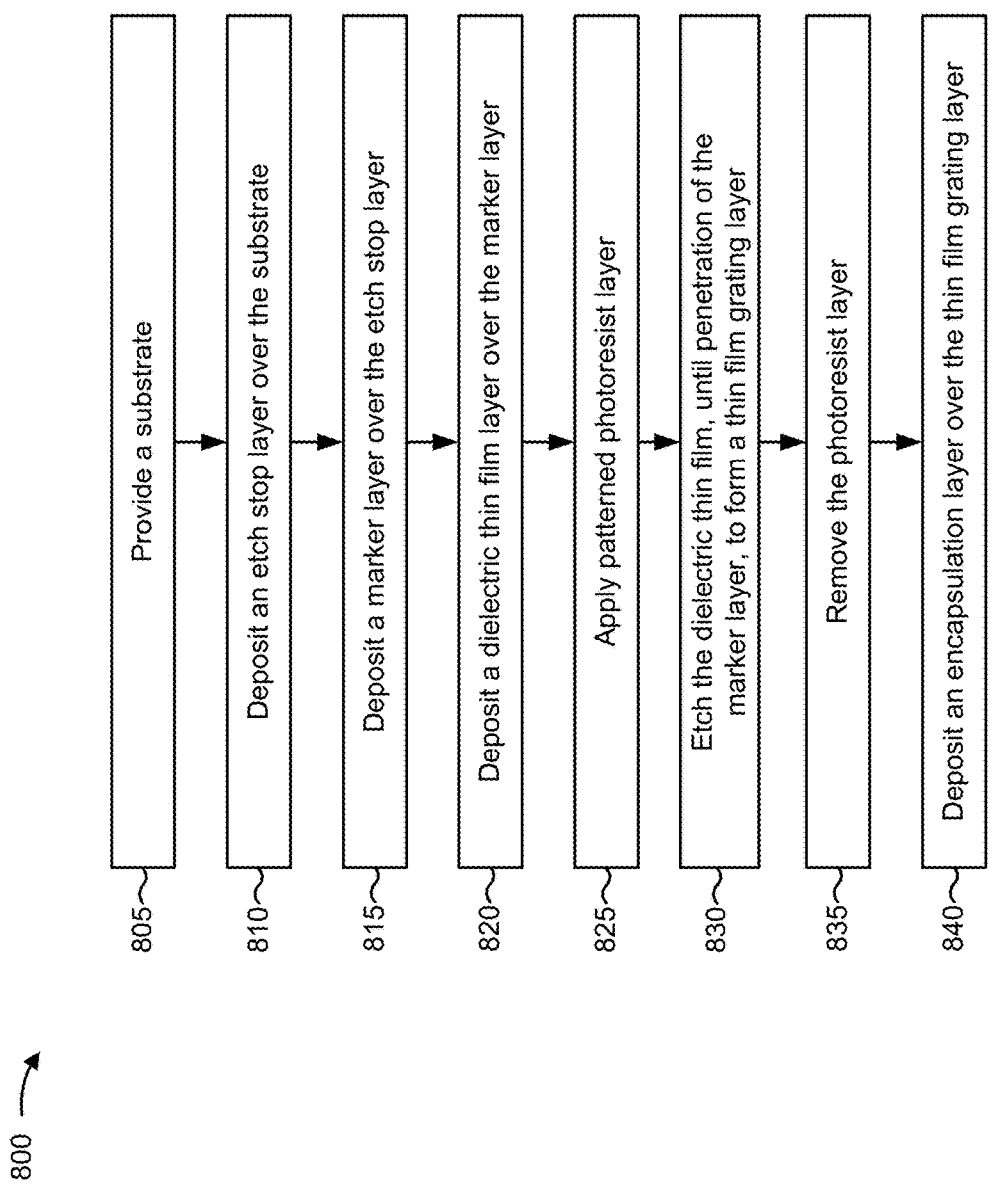
FIG. 8 is a flow chart of an example process for manufacturing a thin film TIR diffraction grating described herein.

FIG. 8 is a flow chart of an example process 800 for manufacturing thin film TIR diffraction grating 245, as described herein. Notably, while example process 800 is described in the context of manufacturing thin film TIR diffraction grating 245, other thin film TIR diffraction gratings described herein (e.g., thin film TIR diffraction gratings 200, 235, or 240) may be manufactured using a similar process (e.g., using a subset of blocks of example process 800).

At block 805, example process 800 may include providing substrate 205 (i.e., a wafer) on which thin film TIR diffraction grating 245 is to be formed. At block 810, etch stop layer 210, associated with preventing etching of substrate 205, is deposited on or over substrate 205. At block 815, marker layer 225, associated with signaling or indicating an etch end-point during etching, is deposited on or over etch stop layer 210. In some implementations, as described above, marker layer 225 may be deposited within an on-chip area and/or an off-chip area of substrate 205. At block 820, a dielectric thin film layer, from which thin film grating layer 215 is to be formed, is deposited on or over marker layer 225 and/or etch stop layer 210 layer.

At step 825, a photoresist layer is patterned over the dielectric thin film layer in order to mask portions of the dielectric thin film layer that are not to be etched during formation of thin film grating layer 215. At block 830, the dielectric thin film layer is etched through the patterned photoresist layer to form thin film grating layer 215. Here, the etching may proceed until the etching penetrates marker layer 225 such that marker layer 225 signals or indicates the etch end-point by producing reactants for detection by, for example, a mass spectrometer. Upon detecting an increase or peak in the amount of the reactants, the mass spectrometer may cause the etching to stop. At block 835, the photoresist layer is removed.

At block 840, encapsulation layer 230 is deposited on or over thin film grating layer 215, exposed portions of etch stop layer 210 and/or marker layer 225 within grooves of thin film grating layer 215 (e.g., such that the grooves are filled with encapsulation layer 230). Encapsulation layer 230 may be deposited such that a difference between a thickness of encapsulation layer 230 and a thickness of thin film grating layer 215 (e.g., a height of a ridge of thin film grating layer 215) is a desired distance. In some implementations, encapsulation layer 230 may be planarized after being deposited. In some implementations, encapsulation layer may be planarized to reduce the thickness of the encapsulation layer to approximately 0.25 microns greater than the thickness of the grating layer. In some implementations, the marker layer is formed of tantala, silica or silicon nitride and has a thickness that is less than or equal to approximately 50 nanometers. In some implementations, an area corresponding to the portion of the etch stop layer on which the marker layer is deposited is an off-chip area of the substrate.

In some embodiments, the process 800 may include attaching, bonding or otherwise joining the diffraction grating to a prism by the side of the substrate opposite to the thin film grating layer (e.g., the bottom of the substrate 205) to form a grism.

Although FIG. 8 shows example blocks of process 800, in some implementations, process 800 may include additional blocks, fewer blocks, different blocks, or differently arranged blocks than those depicted in FIG. 8. Additionally, or alternatively, while example process 800 describes layers of thin film TIR diffraction grating 245 as being deposited, in some implementations, layers of thin film TIR diffraction grating 245 may be fabricated in another manner, such as by being grown, formed, chemically reacted, sprayed, or the like.

Implementations described herein provide various implementations of thin film dielectric reflective diffraction gratings that operate based on total internal reflection (TIR). The thin film TIR diffraction gratings, described herein, include a small number (e.g., one, two) of reflective dielectric thin film layers, while still achieving high DE (e.g., greater than or equal to 94%) in the $-1^{st}$ order for the TM polarization and/or the TE polarization. Furthermore, the thin film TIR diffraction gratings, described herein, prevent propagation of transmitted orders, thereby preventing insertion loss due to light leaking in such transmitted orders. In some implementations, the thin film TIR diffraction grating may be designed to achieve high DE for a single polarization (e.g., the TM polarization or the TE polarization), or dual polarizations (e.g., the TM polarization and the TE polarization) of light.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A diffraction grating, comprising:
a substrate;
an etch stop layer to prevent etching of the substrate,
the etch stop layer being on the substrate;
a marker layer, comprising an etchable material, that indicates an etch end-point associated with etching of a dielectric layer,
the marker layer being on a portion of the etch stop layer; and
the dielectric layer that forms a periodic grating layer after being etched,
the dielectric layer being on at least the marker layer.

2. The diffraction grating of claim 1, further comprising:
an encapsulation layer to protect the periodic grating layer after etching of the dielectric layer,
the encapsulation layer being on at least the periodic grating layer.

3. The diffraction grating of claim 1, where the marker layer comprises tantala, silica or silicon nitride.

4. The diffraction grating of claim 1, where a thickness of the marker layer is less than or equal to approximately 50 nanometers.

5. The diffraction grating of claim 1, where a first diffraction efficiency of the diffraction grating is greater than 96 percent and a second diffraction efficiency of the diffraction grating is less than approximately 2 percent,
the first diffraction efficiency corresponding to a transverse-magnetic polarization, and
the second diffraction efficiency corresponding to a transverse-electric polarization.

6. The diffraction grating of claim 1, where a first diffraction efficiency of the diffraction grating and a second diffraction efficiency of the diffraction grating are greater than 94 percent,
the first diffraction efficiency corresponding to a transverse-magnetic polarization, and
the second diffraction efficiency corresponding to a transverse-electric polarization.

7. The diffraction grating of claim 1, where the dielectric layer comprises silicon or tantala.

8. A diffraction grating, to operate based on total internal reflection, comprising:
a substrate;
an etch stop layer to prevent etching of the substrate,
the etch stop layer being on the substrate;
a dielectric grating layer on the etch stop layer,
the dielectric grating layer being a periodic grating; and
an encapsulation layer to protect the dielectric grating layer,
the encapsulation layer being on at least the dielectric grating layer, and
the encapsulation layer comprising a planar surface that spans a width of the dielectric grating layer.

9. The diffraction grating of claim 8, further comprising:
a marker layer to signal an etch end-point associated with etching of the dielectric grating layer,
the marker layer being on the etch stop layer, and
the dielectric grating layer being on the marker layer.

10. The diffraction grating of claim 8, where the encapsulation layer comprises silica.

11. The diffraction grating of claim 8, where a thickness of the encapsulation layer is approximately 0.15 microns to 0.28 microns greater than a thickness of the dielectric grating layer.

12. The diffraction grating of claim 8, where a first diffraction efficiency of the diffraction grating and a second diffraction efficiency of the diffraction grating are greater than 94 percent,
the first diffraction efficiency corresponding to a transverse-magnetic polarization, and
the second diffraction efficiency corresponding to a transverse-electric polarization.

13. The diffraction grating of claim 8, where a first diffraction efficiency of the diffraction grating is greater than 96 percent and a second diffraction efficiency of the diffraction grating is less than approximately 2 percent,
the first diffraction efficiency corresponding to a transverse-magnetic polarization, and
the second diffraction efficiency corresponding to a transverse-electric polarization.

14. The diffraction grating of claim 8, where the diffraction grating is included in a grism assembly.

15. A method of manufacturing a diffraction grating, the method comprising:

depositing an etch stop layer on a substrate;
depositing a marker layer on a portion of the etch stop layer;
depositing a dielectric layer on the marker layer;
etching the dielectric layer to form a grating layer,
during etching the dielectric layer,
preventing, by the etch stop layer, etching of the substrate; and
determining, based on etching the marker layer, that the etching the dielectric layer is to be stopped; and
etching the marker layer to indicate an etch end-point associated with the etching of the dielectric layer.

16. The method of claim 15, further comprising:
depositing an encapsulation layer associated with protecting the grating layer,
the encapsulation layer to be deposited on the grating layer.

17. The method of claim 16, where the encapsulation layer is formed of silica and a difference between a thickness of the encapsulation layer and a thickness of the grating layer is approximately 0.25 microns.

18. The method of claim 15, where the marker layer is formed of tantala, silica or silicon nitride and has a thickness that is less than or equal to approximately 50 nanometers.

19. The method of claim 15, where an area corresponding to the portion of the etch stop layer on which the marker layer is deposited is an off-chip area of the substrate.

20. The method of claim 15, where a first diffraction efficiency of the diffraction grating and a second diffraction efficiency of the diffraction grating are greater than 94 percent,
the first diffraction efficiency corresponding to a transverse-magnetic polarization, and
the second diffraction efficiency corresponding to a transverse-electric polarization.

* * * * *